(12) United States Patent
Yamada et al.

(10) Patent No.: US 8,661,055 B2
(45) Date of Patent: Feb. 25, 2014

(54) FILE SERVER SYSTEM AND STORAGE CONTROL METHOD

(75) Inventors: Hajime Yamada, Chigasaki (JP);
Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 251 days.

(21) Appl. No.: 13/122,670

(22) PCT Filed: Mar. 22, 2011

(86) PCT No.: PCT/JP2011/001675
§ 371 (c)(1),
(2), (4) Date: Apr. 5, 2011

(87) PCT Pub. No.: WO2012/127526
PCT Pub. Date: Sep. 27, 2012

(65) Prior Publication Data
US 2012/0246206 A1    Sep. 27, 2012

(51) Int. Cl.
*G06F 17/30*    (2006.01)
(52) U.S. Cl.
CPC ................................. *G06F 17/30067* (2013.01)
USPC ............................ 707/770; 707/649; 709/226
(58) Field of Classification Search
CPC .................................................. G06F 17/30067
USPC ........... 707/770, 649, 650, 826, 827; 709/226
See application file for complete search history.

(56) References Cited

U.S. PATENT DOCUMENTS

| | | | |
|---|---|---|---|
| 6,883,029 B2 * | 4/2005 | Karamanolis et al. | 709/226 |
| 2006/0129537 A1 | 6/2006 | Torii et al. | |
| 2009/0300079 A1 | 12/2009 | Shitomi | |

FOREIGN PATENT DOCUMENTS

| | | |
|---|---|---|
| JP | 2006-164211 | 6/2006 |
| JP | 2009-265778 | 11/2009 |
| JP | 2009-289252 | 12/2009 |

OTHER PUBLICATIONS

IBM; Tivoli Storage Manager for HSM for Windows, version 6.1: Administration Guide; Jan. 1, 2010; pp. 1-176.
O'Connor, Michael, et al.; Introducing File Area Network, First Edition; Mar. 2007; pp. i-x, 1-208; Infinity Publishing.com, West Conshohocken, USA.
PCT International Search Report and Written Opinion on application No. PCT/JP2011/001675 mailed Nov. 7, 2011; 14 pages.

* cited by examiner

*Primary Examiner* — Shahid Alam
(74) *Attorney, Agent, or Firm* — Foley & Lardner LLP

(57) ABSTRACT

In accordance with a first aspect of the present invention, an edge node is provided with the storage destination management information that is corresponded to the edge node. The storage destination management information includes the information that indicates a storage destination for a core node of a file that has been written to a file storage region (an edge storage region) for an edge node that is corresponded to the information and includes the information that indicates a recall date that is a date that has been read by the edge node. The edge node judges whether or not there is an old file (a file before an update) in an edge storage region for the edge node based on the storage destination management information that is corresponded to the edge node and the storage destination information that is corresponded to another edge node, and create a stub for only an old file without creating a stub for a file after an update (a latest file).

12 Claims, 26 Drawing Sheets

Fig. 6

| Parent directory | inode number | Child directory inode number |
|---|---|---|
| / | 2 | 10 |
| home | 10 | 15 |
| user-01 | 15 | 100 |
| a.txt | 100 | Data block |

Fig. 7

| Inode number | Owner | Access right | Size | Time and date of update | Data block address 1 | Data block address 2 | Data block address 3 |
|---|---|---|---|---|---|---|---|
| ... | ... | ... | ... | | ... | ... | ... |
| 100 | user001 | u:g:o rxw rxw rxw | 1000KB | 2009/12/23 12:00:00 | 100-3 | 200-2 | 250-5 |
| ... | ... | ... | ... | | ... | ... | ... |

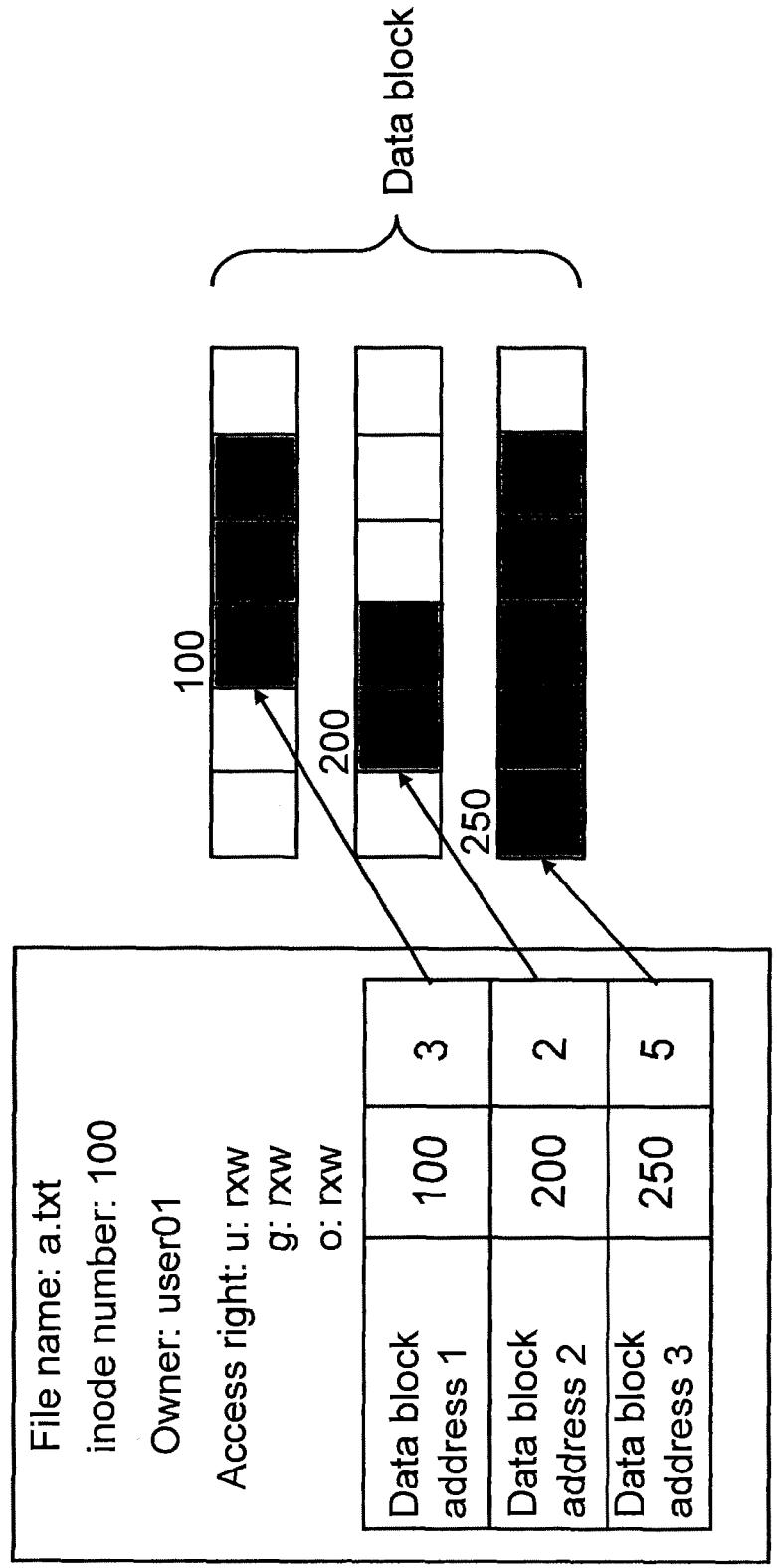

Fig. 9A

| 1216 12161 | 12162 | 12163 |
|---|---|---|
| File storage destination hash value | File entity hash value | Time and date of recall |
| aaabbbccc | xxxyyyzzz | 2010/10/22 12:00:10 |
| aaabbb123 | xxxyyy456 | 2010/10/22 11:00:10 |
| aaabbb256 | xxxyyy269 | 2010/10/22 11:00:10 |

Fig. 9B

| 1217 12171 | 12172 | 12173 |
|---|---|---|
| Group ID | Group configuration | Representative flag |
| 01 | 120B1 | 1 |
| 01 | 120B2 | 0 |
| 01 | 120B3 | 0 |
| 02 | 120B4 | 1 |
| 02 | 120B5 | 0 |

| File storage destination hash value | File entity hash value | Time and date of recall |
|---|---|---|
| aaabbbccc | xxxyyyzzz | 2010/10/22 12:00:10 |
| aaabbb123 | xxxyyy456 | 2010/10/22 11:00:10 |
| aaabbb256 | xxxyyy269 | 2010/10/22 11:00:10 |

12161 / 12162 / 12163

1216B2

| File storage destination hash value | File entity hash value | Time and date of recall |
|---|---|---|
| aaabbbccc | xxxyyy123 | 2010/10/22 11:00:10 |
| aaabbb123 | xxxyyy456 | 2010/10/22 11:00:10 |
| aaabbb256 | xxxyyy269 | 2010/10/22 11:00:10 |

12161 / 12162 / 12163

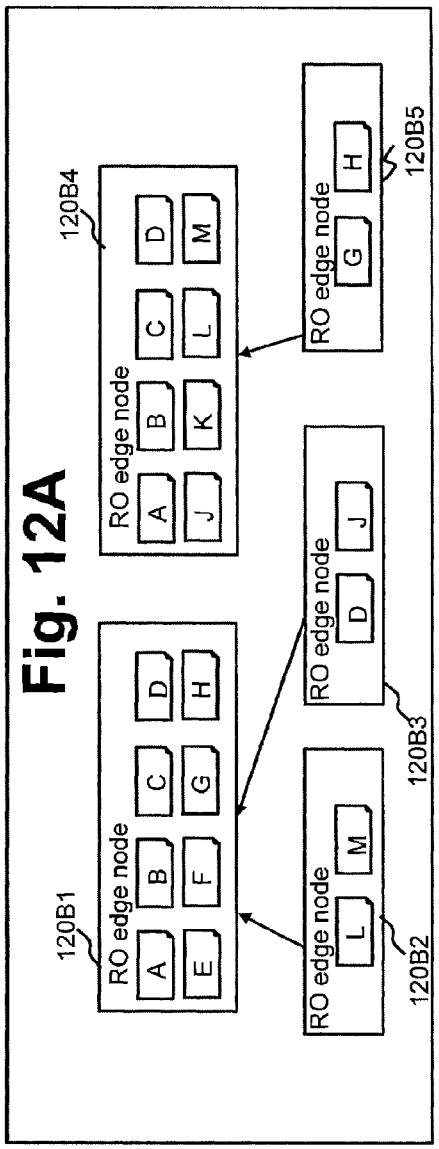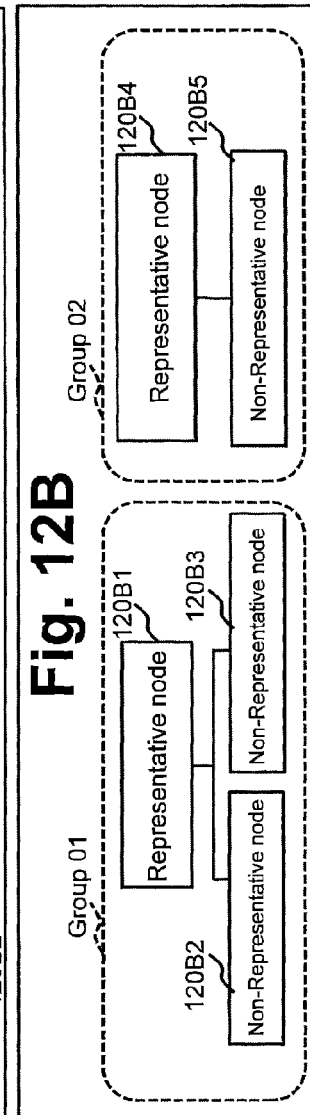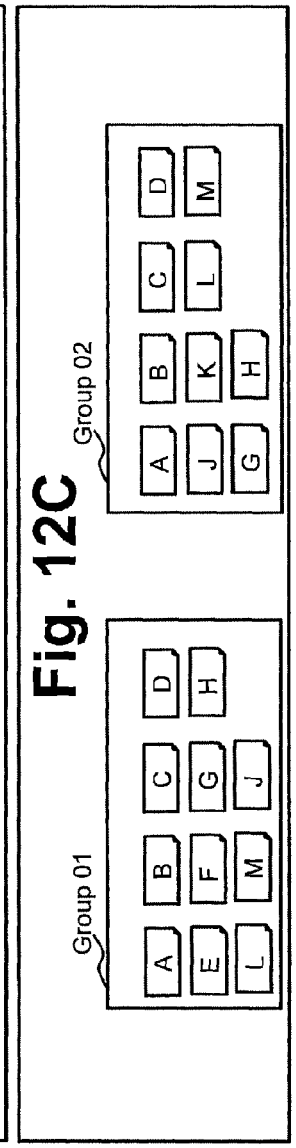

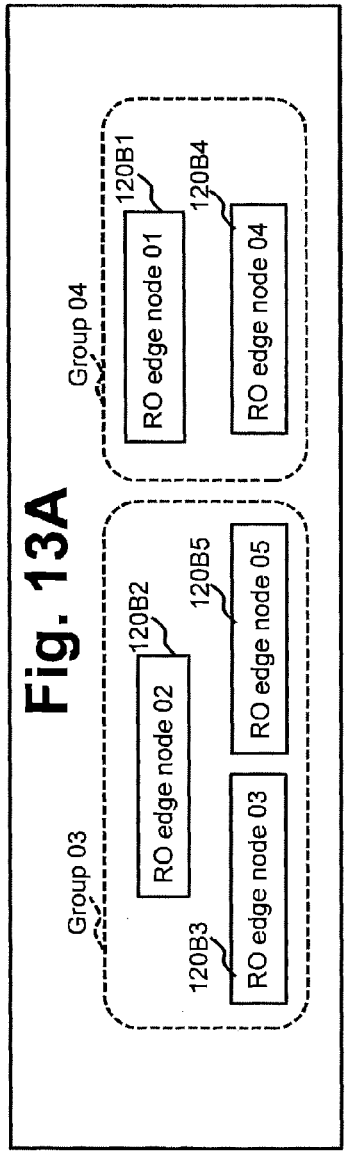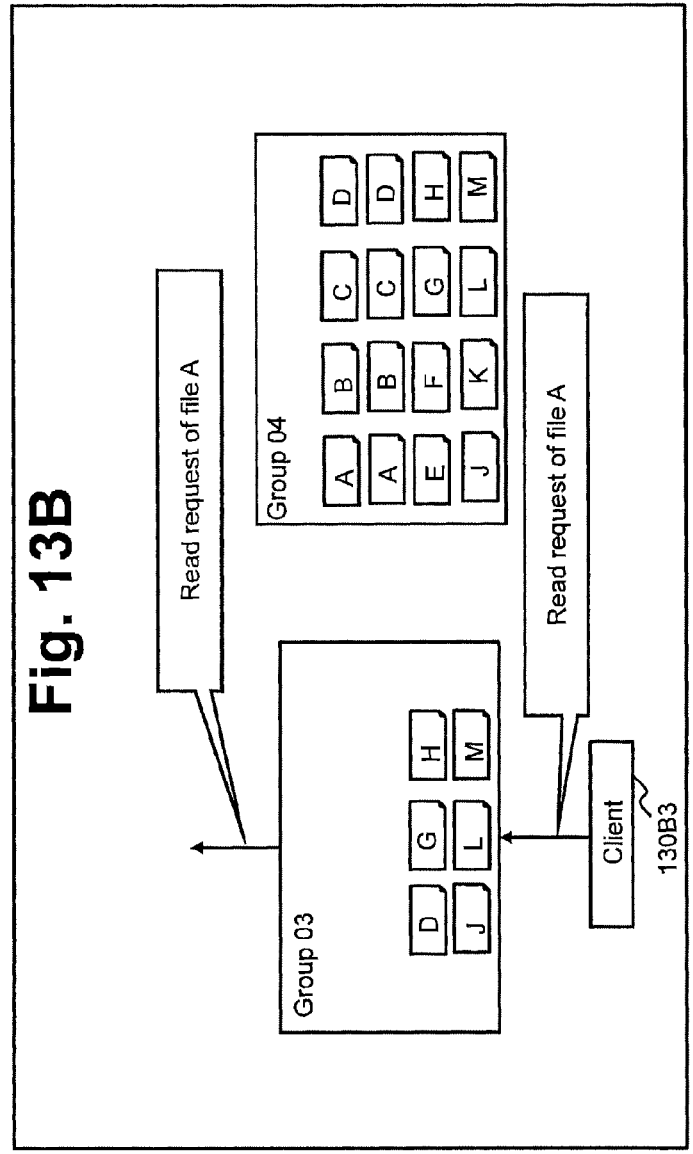

FILE SERVER SYSTEM AND STORAGE CONTROL METHOD

TECHNICAL FIELD

The present invention relates to a storage control for a file server system that is provided with a plurality of file servers.

BACKGROUND ART

A hierarchical file server system that is configured by a plurality of file servers that are coupled to a communication network is publicly known for instance. As a hierarchical file server system of such a type, there can be mentioned for instance a system that is provided with an edge node that is a file server that receives a request from a client (a local file server) and a core node that is a file server that receives a request from an edge node (a remote file server).

As a hierarchical file server system, there can also be mentioned for instance a system in which an edge node and a core node are disposed on a one-to-one basis (see Patent Literature 1) and a system in which an edge node and a core node (for instance, a cloud storage) are disposed on an N-to-one basis (N is an integer number equal to or larger than 2) (in other words, a system in which a plurality of edge nodes shares one core node).

The following problem may occur unfortunately for the system in which an edge node and a core node are disposed on an N-to-one basis.

For instance, a plurality of edge nodes has already read a file that is included in a core node, a file of an edge node is updated, and a file after the update is stored from the edge node into the core node. However, other edge nodes do not recognize that a file that has already been read has been updated. Consequently, in the case in which other edge nodes receive a read request that specifies a file that has already been read (a file before an update), the edge nodes transmit the file before an update to a client unfortunately.

As a method for solving the problem, it is thought that each of the edge nodes is provided with a stub of a file that is included in a core node for instance. The stub is an object (for instance, metadata) that is associated with the storage destination information of the file (the information that indicates a link destination). According to this method, in the case in which an edge node receives a read request that specifies a stub, the edge node reads a file of a link destination of the stub (that is, a file in a core node). Consequently, the edge node does not transmit the file before an update to a client.

In this case however, in each case in which each of the edge nodes receive a read request that specifies a stub, the edge nodes access a core node. Consequently, accesses are concentrated to one core node, whereby a load to the core node is increased.

As a method for solving the problem, it is thought that a plurality of core nodes and an intermediate apparatus that is coupled to the plurality of core nodes and a plurality of edge nodes are prepared for instance. As a literature that is associated with the method of this type, Patent Literature 1 and Patent Literature 2 can be mentioned for instance.

In accordance with Patent Literature 2 for instance, a virtual server is configured by a plurality of servers, and a load distribution apparatus is adopted as an intermediate apparatus. The load distribution apparatus distributes a plurality of accesses executed to the virtual server from a plurality of clients to a plurality of servers that configure the virtual server.

Moreover in accordance with Patent Literature 3 for instance, a file that is included in a first server is made to be a stub, and the file is migrated to a second server. In the case in which an intermediate apparatus receives an access request that specifies a stub from a client, the intermediate apparatus responds to the client by the file that is included in the second server.

CITATION LIST

Patent Literature

PTL 1: Japanese Patent Application Laid-Open Publication No. 2009-289252
PTL 2: Japanese Patent Application Laid-Open Publication No. 2009-265778
PTL 3: Japanese Patent Application Laid-Open Publication No. 2006-164211

SUMMARY OF INVENTION

Technical Problem

However, in accordance with the above method, a plurality of core nodes is required for a plurality of edge nodes and an intermediate apparatus (such as a load distribution apparatus) is also required, thereby increasing a cost unfortunately.

Moreover, even in the case in which a migration of a file from a core server to another core server is necessary, if a vendor of a core server is different from a vendor of another core server, a migration of a file from a core server to another core server cannot be executed.

An object of the present invention is to suppress the number of times of accesses for a core node without transmitting a file before an update to a client even in the case in which a plurality of core nodes and an intermediate apparatus are not disposed.

Solution of Problem

In accordance with a first aspect of the present invention, an edge node is provided with the storage destination management information that is corresponded to the edge node. The storage destination management information includes the information that indicates a storage destination for a core node of a file that has been written to a file storage region (an edge storage region) for an edge node that is corresponded to the information and includes the information that indicates a recall date that is a date that has been read by the edge node. The edge node judges whether or not there is an old file (a file before an update) in an edge storage region for the edge node based on the storage destination management information that is corresponded to the edge node and the storage destination information that is corresponded to another edge node, and create a stub for only an old file without creating a stub for a file after an update (a latest file).

In accordance with a second aspect of the present invention, a plurality of edge nodes is divided into at least two groups. In the case in which an edge node receives a read request of a read target file that is a file that is corresponded to a stub from a client, the edge node executes the following processing:

(D) judging whether or not the read target file has been stored into a file storage region for any other second edge node that is included in a target group that is a group that includes the edge node;

(E) executing a recall of the read target file in the case in which the result of a judgment of the above (D) is negative; and (F) transmitting a read request of the read target file to other edge node that is corresponded to a file storage region that has stored the read target file and transmitting the read target file that has been read by a response to the read request to a client in the case in which the result of a judgment of the above (D) is positive.

The at least two groups can be configured in such a manner that a duplicated file is not preferably included in a plurality of files that has been stored into at least two edge storage regions for at least two second edge nodes that are included in one group. Moreover, the storage destination management information described above can also be used in the judgment of the above (D). In the second aspect of the present invention, it is also possible that the storage destination management information does not include the information that indicates a recall date. Moreover, a storage destination for a core node of a read target file that has been stored into a file storage region for other edge node can also be equivalent to a storage destination that is indicated by a stub.

The file storage region described above can be disposed inside or outside an edge node. Moreover, although the file storage region is a file system in a representative pattern, the file storage region can also be a storage region of other type.

BRIEF DESCRIPTION OF DRAWINGS

FIG. 6 is a view showing a part related to a directory in an inode management table.

FIG. 7 is a view showing a part related to a file in an inode management table.

FIG. 8 is a view showing a relationship between a file "a.txt" and a location of data that configures the file.

FIG. 9A is a view showing a configuration of a storage destination management table 1216. FIG. 9B is a view showing a group management table 1217.

FIG. 11 is a view showing a storage destination management table 1216B1 that is corresponded to an RO edge node 120B1 and a storage destination management table 1216B2 that is corresponded to an RO edge node 120B2.

FIG. 12A is a view showing an example of an edge table creation processing based on a file that has already been cached for each RO edge node. FIG. 12B is a view showing a result of the edge table creation processing shown in FIG. 12A. FIG. 12C is a view showing a file that has already been cached for each of the groups shown in FIG. 12B.

FIG. 13A is a view showing an example of a configuration of another edge group. FIG. 13B is a view showing an example of a problem for another edge group.

DESCRIPTION OF EMBODIMENTS

Figure 1:
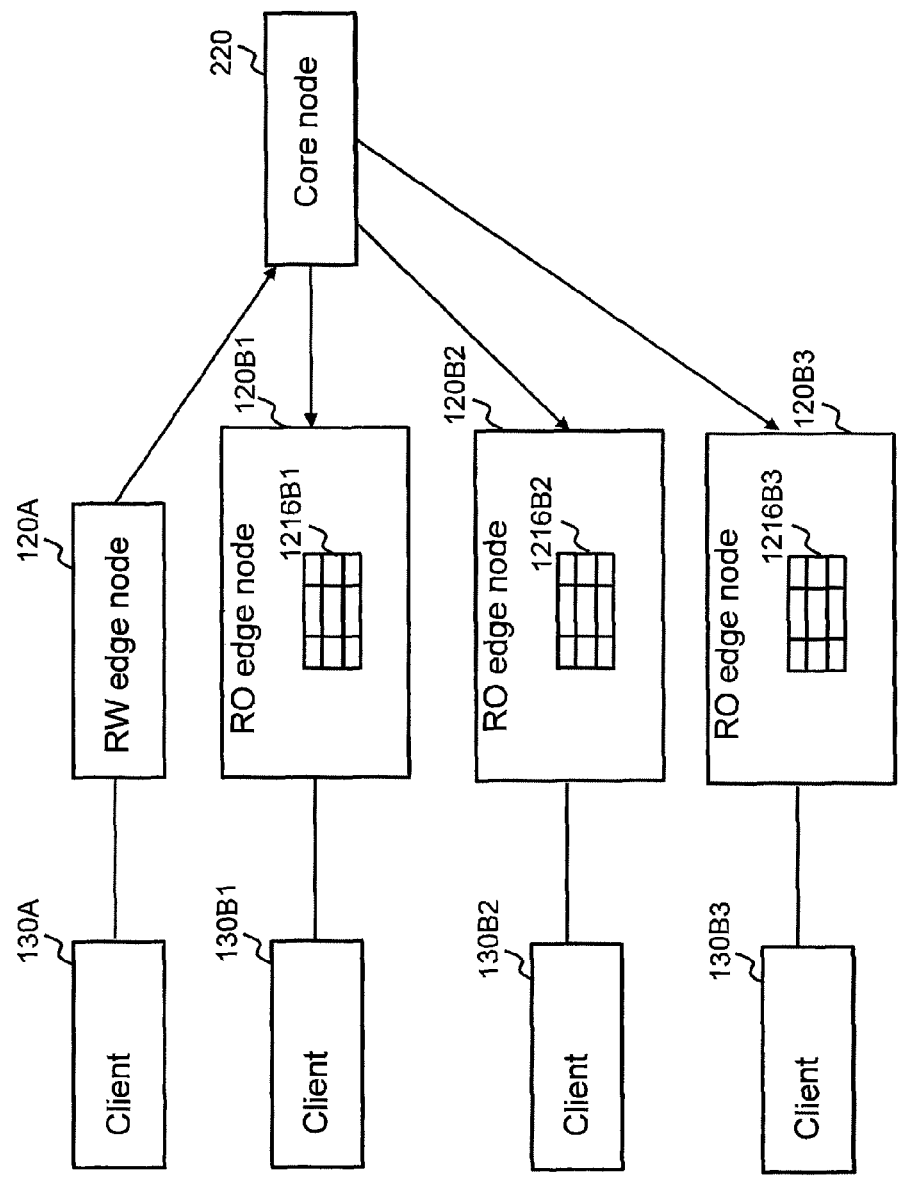
FIG. 1 is a view showing a general outline in accordance with an embodiment 1 of the present invention.

Some embodiments (examples) of the present invention will be described below in detail with reference to the drawings.

In the following descriptions, while a wide variety of information will be described in the expression of "xxx table" in some cases, a wide variety of information can be represented by a data structure other than a table. In order to indicate that a data structure is not depended on, "xxx table" can also be referred to as "xxx information".

In the following descriptions, while an ID (identifier) is used for specifying an element, a name or a number can also be used as an ID.

In the following descriptions, the processing will be described while a "program" is handled as a subject in some cases. In the case in which the program is executed by a processor (for instance, a CPU (Central Processing Unit)) that is included in a controller, the processor executes the predetermined processing by using a storage resource (such as a memory) and/or a communication interface apparatus (such as a communication port) as it decides proper. Consequently, a subject of a processing can also be a processor. The processing that is described while a program is handled as a subject can also be a processing that is executed by a file server (such as an RO (Read Only) edge node, an RW (Read Write) edge node, and a core node that are described later) or a management server. Moreover, the controller can include a hardware circuit that executes a part or a whole of a processing. A computer program can be installed from a program source to each of the computers (such as a file server and a management server). The program source can be a program distribution server or a storage medium that can be read by a computer for instance.

A management server can also be at least one computer. For instance, in the case in which a management server indicates the information or a management server transmits the information for an indication to a remote computer, one computer is a management server. Moreover, in the case in which a function equivalent to a management server is implemented by using a plurality of computers for instance, the plurality of computers is a management server (the plurality of computers can include a computer for an indication in the case in which a computer for an indication executes an indication).

In the following descriptions moreover, in the case in which elements of the same type (for instance, a client, an edge node, and an RO edge node) are not distinguished for a description, only common signs among referential signs are used. On the other hand, in the case in which elements of the same type are distinguished for a description, referential signs (a combination of a common sign and an individual sign) are used, or the identification information that is added to an element is used as substitute for a referential sign.

Moreover, while a term of a "date" will be used in the following descriptions, the "date" includes at least any one of a year, a month, a day, an hour, a minute, and a second (that can include a second after the decimal point). For instance, the "date" can include a year, a month, and a day, and the "date" can also include an hour, a minute, and a second in addition to them.

Embodiment 1

FIG. 1 is a view showing a general outline in accordance with an embodiment 1 of the present invention.

A server system in accordance with the present embodiment is provided with a plurality of edge nodes 120 that are coupled to a plurality of clients (for instance, a computer such as a personal computer) 130 and a core node 220 that is coupled to a plurality of edge nodes 120. In the present embodiment, the server system is provided with one core node 220, and the core node 220 is shared by the plurality of edge nodes 120.

The edge node 120 is a local file server (that is, a file server that receives a request from a client 130), and the core node 220 is a remote file server (that is, a file server that receives a request from the edge node 120). The client 130 and the edge node 120 can be coupled to a first communication network (such as a LAN (Local Area Network)), and the edge node 120 and the core node 220 can be coupled to a second communication network (for instance, a communication network that is independent from the first communication network (such as the Internet)). In the example shown in FIG. 1, the clients 130A, 130B1, 130B2, and 130B3 are coupled to the edge nodes 120A, 120B1, 120B2, and 120B3, respectively.

Each of the edge nodes 120 is provided with a file storage region (hereafter referred to as an edge storage region). The core node 220 is also provided with a file storage region (hereafter referred to as a core storage region). The edge storage region and the core storage region are a file system representatively. The edge storage region (the core storage region) that is included in a node 120 (130) can be disposed inside or outside the node 120 (130). Moreover, each of the edge nodes 120 can write a file to an edge storage region that is included in the node 120 and can read a file from the edge storage region. However, each of the edge nodes 120 cannot write a file to an edge storage region that is not included in the node 120 and cannot read a file from the edge storage region.

A plurality of edge nodes 120 is configured by at least one RW edge node 120A and RO edge nodes 120B that are more than the RW edge node 120A. Although one RW edge node 120A and three RO edge nodes 120B are disposed in the example shown in FIG. 1, the number of the RO edge nodes 120B can be less or larger than 3 while one RW edge node 120A is disposed.

The RW edge node 120A is an edge node that receives both of a write request and a read request of a file, in other words, an edge node that can not only read a file from a core storage region but also write a file to a core storage region. More specifically, in the case in which the RW edge node 120A receives a write request of a file from a client 130A for instance, the RW edge node 120A writes the file to an edge storage region of the node 120A and writes the file to the core storage region. Moreover in the case in which the RW edge node 120A receives a read request of a file from a client 130A for instance, the RW edge node 120A returns the file in an edge storage region to the client 130A if the file is already in the edge storage region of the node 120A (that is, if the file has already been cached). On the other hand, in the case in which the file has not been cached, the RW edge node 120A reads the file from the core storage region (caches the file), and returns the file to the client 130A.

The RO edge node 120B is an edge node that receives a read request of a file and that does not receive a write request of a file, in other words, an edge node that reads a file from a core storage region and that does not write a file to a core storage region. More specifically, in the case in which the RO edge node 120B1 receives a read request of a file from a client 130B1 for instance, the RO edge node 120B1 returns the file in an edge storage region to the client 130B1 if the file is already in the edge storage region of the node 120B1 (that is, if the file has already been cached). On the other hand, in the case in which the file has not been cached, the RO edge node 120B1 reads the file from the core storage region and returns the file to the client 130B1 (the file that has been read can be cached). Moreover in the case in which a file that is specified by a read request is a stub of the file, the RO edge node 120B1 reads the file from a storage destination that is specified by the stub (that is, a region in the core storage region) and returns the file to the client 130B1. In the processing in which the RO edge node 120B reads a file from the core storage region, the RO edge node 120B transmits a read request of a file to a core node 220, and the core node 220 responds to the read request and returns the file that is specified by the read request to the RO edge node 120B.

Each of the RO edge nodes 120B is provided with a table (hereafter referred to as a storage destination management table) 1216 configured to manage a storage destination (a region in the core storage region) of a file that has been cached by the RO edge node 120B. The storage destination management table 1216 can be managed inside or outside the RO edge node 120B. The storage destination management table 1216 is managed inside the RO edge node 120B in the present embodiment, and the storage destination management table 1216 is managed outside the RO edge node 120B in an embodiment 2 describer later.

The following processing is executed by the above configuration in the present embodiment for instance.

The RO edge node 120B executes a recall of a file (that is, reads a file from a core storage region and caches the file) in a repetitive manner (on a regular basis or on an irregular basis). At this time, the RO edge node 120B updates the storage destination management table 1216 that is included in the node 120B.

For instance, a file that has been cached by the RW edge node 120A is updated, and a file after the update is stored into a core storage region from the RW edge node 120A. After that, the RO edge node 120B1 executes a recall of the file after the update from the core storage region, and updates the storage destination management table 1216 that is included in the node 120B1.

Consequently, although the file after the update is cached to the RO edge node 120B1, a file before the update is cached to the RO edge nodes 120B2 and 120B3 and a file after the update is not cached to the RO edge nodes 120B2 and 120B3. Consequently, the RO edge node 120B2 (or 120B3) receives a read request that specifies a file before the update from the client 130B2 (or 130B3), and the RO edge node 120B2 (or 120B3) responds to the read request and returns the cached file before the update to the client 130B2 (or 130B3).

To solve the above problem, it is thought that a stub is created for all files that have been cached by the RO edge nodes 120B2 and 120B3. However in this case, in each case in which the RO edge nodes 120B2 and 120B3 receive a read request, the RO edge nodes 120B2 and 120B3 access a core node 220 (transmit a read request to the core node 220). Consequently, a load of the core node 220 is increased unfortunately.

In the present embodiment, a stub is created for only a file before an update and a stub is not created for a file that have not been updated among all files that have been cached by the RO edge nodes 120B1 to 120B3 by the following processing. In other words, the number of files for which a stub is created can be reduced.

More specifically, the RO edge node 120B2 compares the storage destination management table 1216 that is managed by the node 120B2 with the storage destination management table 1216 that is included in each of the other RO edge nodes 120B1 and 120B3 for instance. The RO edge node 120B2 specifies a file before an update (a file for which a stub is to be created) among at least one file that has been cached for the node 120B2 based on the result of the comparison. The RO edge node 120B2 then creates a stub for only the specified file before an update (a stub in which a link destination is a file after an update in a core storage region).

By the above configuration, in the case in which the RO edge node 120B2 receives a read request that specifies a stub from a client 130B2, the RO edge node 120B2 can read a file after an update that is specified by the stub from a core storage region and can return the file after the update to the client 130B2. In other words, in the present embodiment, a file before an update can be prevented from being transmitted to a client 130B. In the present embodiment moreover, since the number of files for which a stub is created can be reduced as described above, the number of accesses to a core node 220 can be reduced.

Figure 2:
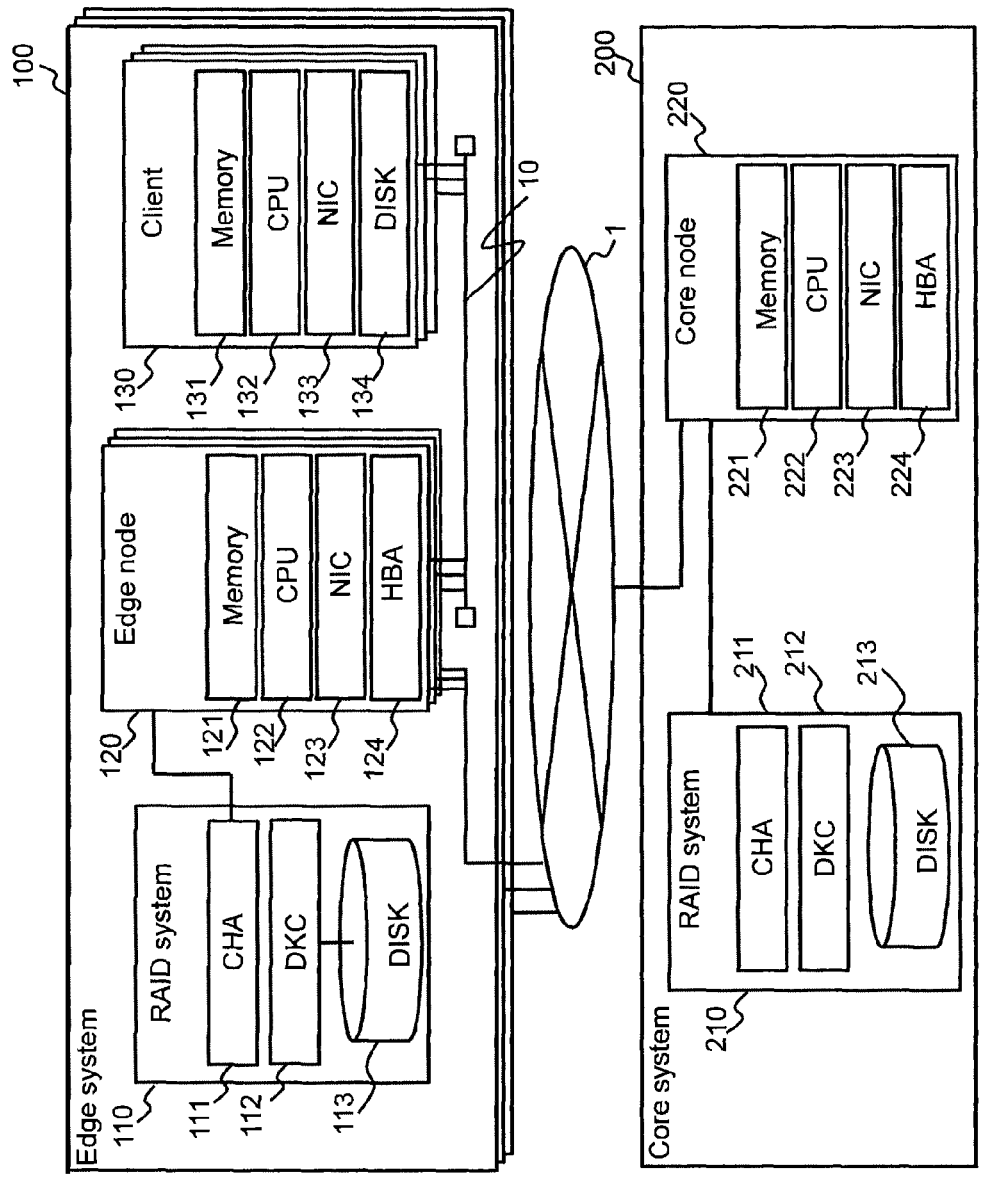
FIG. 2 is a view showing a hardware configuration of an entire system in accordance with an embodiment 1 of the present invention.

FIG. 2 is a view showing a hardware configuration of an entire system in accordance with the present embodiment.

The system is provided with an edge system 100 and a core system 200. The edge system 100 is a stronghold that includes a local computer system, for instance a stronghold such as a branch office or a sales office in which a user executes a business as a practical matter. The core system 200 is a stronghold that includes a remote computer system, for instance a stronghold for managing a server or a storage apparatus in a lump or a stronghold for providing a cloud service.

Although a plurality of edge systems 100 are shown in the example of FIG. 2, only one edge system 100 can also be disposed. Moreover, although a plurality of clients 130 that are coupled to an edge node 120 is shown in the example of FIG. 2, only one client can also be disposed.

The edge systems 100 is provided with a RAID (Redundant Array of Independent (or Inexpensive) Disks) system 110, an edge node 120, and a client 130.

The edge node 120 is coupled to the client 130 via a communication network (such as a LAN) 10 for instance. Moreover, the edge node 120 is coupled to the RAID system 110 via a communication network (such as a SAN (Storage Area Network)) that is equivalent to or separate from the communication network 10 for instance.

The RAID system 110 is classified broadly into a controller part and a storage part. The controller part is provided with a CHA (Channel Adaptor) 111 and a DKC (DisK Controller) 112. The storage part is provided with a DISK 113. The CHA 111 and the DISK 113 are coupled to the DKC 112. The CHA 111 is a communication interface apparatus that is coupled to the edge node 120. The DKC 112 is a controller. The DISK 113 is a physical storage device of a disk type (such as an HDD (Hard Disk Drive)). As a physical storage device, a physical storage device of other type (such as a flash memory device) can also be adopted. Although one DISK 113 is disposed in the example shown in FIG. 2, a plurality of DISKs 113 can also be disposed. A plurality of DISKs 113 can configure at least one RAID group. In the present embodiment, the RAID system 110 is shared by a plurality of edge nodes 120. A plurality of edge storage regions (such as an LU (Logical Unit) that is used as a file system) that are corresponded to a plurality of edge nodes 120 are disposed based on the DISK 113.

The RAID system 110 receives an I/O (Input/Output) request of a block level that has been transmitted from the edge node 120 by using the CHA 111, and executes an I/O to the appropriate DISK 113 based on a control of the DKC 112.

The edge node 120 is provided with a memory 121, a CPU (Central Processing Unit) 122, and a NIC (Network Interface Card) 123, and an HBA (Host Bus Adaptor) 124. The CPU 122 is coupled to the memory 121, the NIC 123, and the HBA 124.

The NIC 123 is a communication interface apparatus that is configured to communicate with the core node 220 and the client 130.

The HBA 124 is a communication interface apparatus that is configured to communicate with the RAID system 110.

The memory 121 is a storage region (such as a RAM (Random Access Memory) and a ROM (Read Only Memory)) that can be read and written by the CPU 122. The CPU 122 executes a computer program that has been stored into the memory 121, whereby a wide variety of functions can be implemented for the edge node 120. The edge node 120 can also be provided with storage resources of other kinds in addition to or as substitute for the memory 121.

The edge node 120 receives an I/O request of a file level from the client 130 via the NIC 123. The edge node 120 creates an I/O request (an I/O request of a block level) for an I/O of a data block that configures a file that is specified by the I/O request. The edge node 120 transmits an I/O request of a block level to the RAID system 110 via the HBA 124.

The client 130 is provided with a memory 131, a CPU 132, a NIC 133, and a DISK 134. The client 130 can also be provided with storage resources of other kinds in addition to or as substitute for the memory 131 and/or the DISK 134.

The CPU 132 executes a computer program that has been stored into the memory 131, whereby a wide variety of functions can be implemented for the client 130. The client 130 transmits an I/O request of a file level to the file storage apparatus 120 via the NIC 133. The DISK 134 is a physical storage device of a disk type (such as an HDD (Hard Disk Drive)).

The core system 200 is provided with a RAID system 210 and a core node 220. The RAID system 210 is coupled to the core node 220.

The RAID system 210 is provided with a CHA 211, a DKC 212, and a DISK 213. In the example shown in FIG. 2, the configuration of the RAID system 210 in the core system 200 is equivalent to that of the RAID system 110 in the edge system 100. Consequently, for the RAID system 210, the CHA 211 receives an I/O request of a block level that has been transmitted from the core node 220, and an appropriate I/O to the DISK 213 is executed based on a control of the DKC 212. It is also possible that the configuration of the RAID system 210 is different from that of the RAID system 110.

The core node 220 is provided with a memory 221, a CPU 222, a NIC 223, and an HBA 224. The core node 220 can also be provided with storage resources of other kinds in addition to or as substitute for the memory 221. The CPU 222 executes a computer program that has been stored into the memory 221, whereby a wide variety of functions can be implemented for the core node 220. Moreover, the core node 220 communicates with the edge node 120 via the NIC 223 and a communication network 1 (such as the Internet). The core node 220 transmits an I/O request of a block level to the RAID system 210 via the HBA 224.

Figure 3:
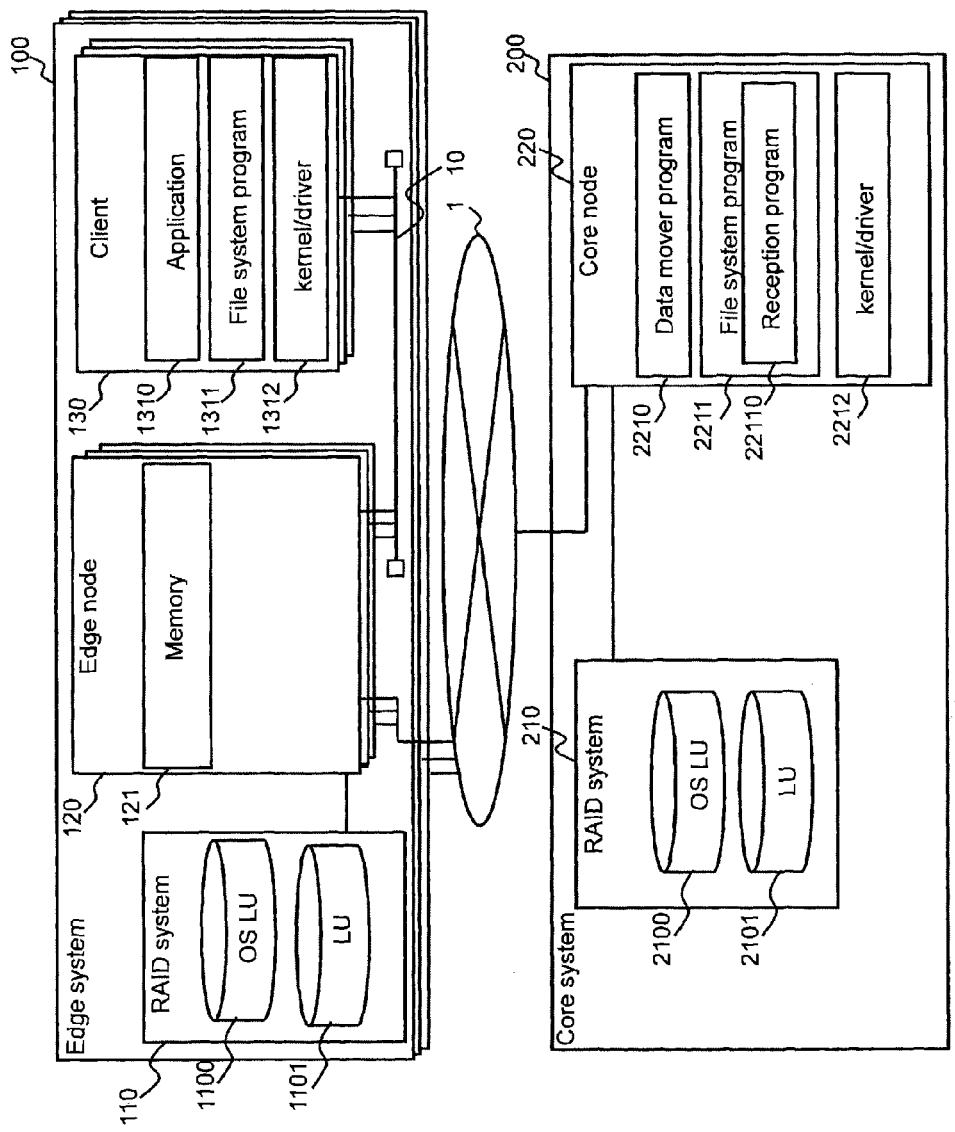
FIG. 3 is a view showing a hardware configuration of an entire system in accordance with an embodiment 1 of the present invention.

FIG. 3 is a view showing a hardware configuration of an entire system in accordance with an embodiment 1 of the present invention.

The RAID system 110 (210) is provided with an LU 1101 (2101) in which an OS of the edge node 120 is not stored and an LU (OS LU) 1100 (2100) in which an OS of the edge node 120 is stored as an LU. The LU is a logical storage device. The LU can be a substantive LU based on at least one DISK 113 (213) and can be a virtual LU that conforms to Thin Provisioning. The LU is configured by a plurality of blocks (storage regions), and a file is stored into the LU.

The memory 221 of the edge node 120 stores at least one computer program. The computer program will be described later in detail.

The memory 231 of the client 130 stores an application 1310, a file system program 1311, and a kennel/driver 1312.

The application 1310 is software (an application program) that is used according to a purpose of a work by the client 130. The descriptions of the file system program 1311 and the kernel/driver 1312 are omitted. This is because the file system program 1311 is almost equivalent to a file system program 1211 that is included in the edge node 120 and that is described later (see FIG. 4), and the kernel/driver 1312 is almost equivalent to a kernel/driver 1212 that is included in the edge node 120 and that is described later (see FIG. 4).

The memory 221 of the core node 220 stores a data mover program 2210, a file system program 2211, and a kernel/driver 2212. The descriptions of the data mover program 2210, the file system program 2211, and the kernel/driver 2212 are omitted. This is because the data mover program 2210 is almost equivalent to a data mover program 1210 that is included in the edge node 120 and that is described later (see FIG. 4), the file system program 2211 is almost equivalent to the file system program 1211 described above, and the kernel/driver 2212 is almost equivalent to the kernel/driver 1212 described above.

In the following descriptions, the data mover program 1210 in the edge node 120 is referred to as an edge mover 1210, and the data mover program 2210 in the core node 220 described later is referred to as a core mover 2210. In the case in which the edge mover 1210 and the core mover 2210 are not distinguished in particular, the edge mover 1210 and the core mover 2210 are referred to as a data mover program. A file is transmitted and received between the edge node 120 and the core node 220 via the edge mover 1210 and the core mover 2210.

The computer program and information that are included in the edge node 120 will be described in the following with reference to FIG. 4.

The memory 121 of the edge node 120 stores an edge mover 1210, a file system program 1211, a kernel/driver 1212, a file sharing program 1213, a load relaxation control program 1214, a storage destination information sharing program 1215, a storage destination management table 1216, and a group management table 1217.

The edge mover 1210 reads a file of a replication target from the edge storage region, transfers the file to the core node 220, and creates a stub in which the file is a link destination. The core mover 2210 receives the file of a replication target from the edge node 120, and writes the file to the core storage region.

In the case in which the edge mover 1210 receives a read request from the client 130 to the stub (metadata), the edge mover 1210 transmits a read request that specifies a file of a link destination of the stub to the core mover 2210. By this configuration, the file in the core storage region is read from the core mover 2210 to the edge mover 1210.

The file system program 1211 manages a file system. The file system program 1211 is provided with a reception program 12110. The reception program 12110 reads a file or writes a file in accordance with an I/O request (a write request or a read request) from the client 130.

The kernel/driver 1212 executes the general control and a control unique to hardware such as a schedule control of a plurality of programs (processes) that are operated on the edge node 120 and a handling of an interrupt from hardware.

The file sharing program 1213 provides a file sharing service to the client 130 by using a predetermined communication protocol (such as a CIFS (Common Internet File System) and an NFS (Network File System)).

The load relaxation control program 1214 executes a processing for relaxing a load of the core node 220 (more specifically, an edge group creation processing described later).

The storage destination information sharing program 1215 shares a storage destination management table between the RO edge nodes 120B.

The storage destination management table 1216 is provided with the information that indicates a storage destination of a file that has been cached in the edge storage region (a location in the core storage region).

The group management table 1217 is provided with the information related to an edge group that has been created by the load relaxation control program 1214. The "edge group" is an aggregate of at least one RO edge node 120B.

An example of a file system will be described in the following with reference to FIGS. 5 to 8.

Figure 5:
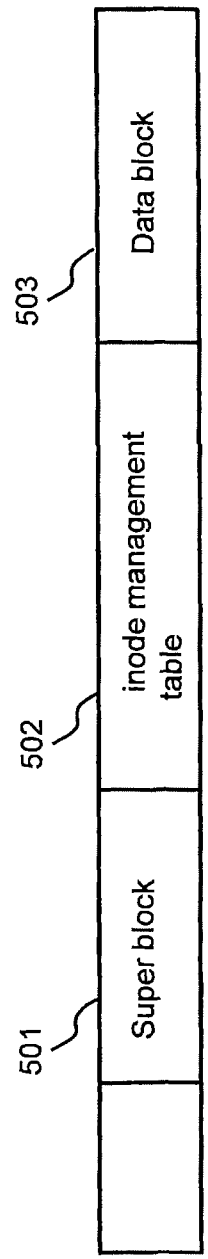
FIG. 5 is a view showing a configuration of a file system.

The file system 500 is provided with a super block 501, an inode management table 502, and a plurality of data blocks 503 as shown in FIG. 5.

The super block 501 holds the information related to a file system. The information includes information related to each of files in the file system (such as the information that indicates a size and a location of a file) for instance.

The inode management table 502 is provided with information related to an inode that is corresponded to each individual directory or file. FIG. 6 is a view showing an example of a part that is provided with information related to an inode that is corresponded to a directory in an Mode management table. FIG. 7 is a view showing an example of a part that is provided with information related to an Mode that is corresponded to a file in an inode management table.

The data blocks 503 stores data that configures a file.

In accordance with an example shown in FIGS. 6 to 8, a file "a.txt" is read as described in the following. In other words, a path of /home/user-01/a.txt is gone through based on the information shown in FIG. 6. More specifically, the data block 100 is accessed according to the flow of "/" (inode number 2)→"home" (inode number "10")→"user-01" (inode number "15")→"a.txt" (inode number 100). The following data (8-1) to (8-3) are obtained as shown in FIG. 8 based on the information shown in FIG. 7.

(8-1) data in three consecutive blocks in which a block of an address 100 is beginning;

(8-2) data in two consecutive blocks in which a block of an address 200 is beginning; and (8-3) data in five consecutive blocks in which a block of an address 100 is beginning. A file that includes data (8-1) to (8-3) is a file "a.txt".

FIG. 9A is a view showing a configuration of a storage destination management table 1216.

The storage destination management table 1216 associates and stores a file storage destination hash value 12161, a file entity hash value 12162, and the time and date of recall 12163 for every file that has been cached in the edge storage region that is included in the RO edge node 120B that is provided with the table 1216.

The file storage destination hash value 12161 is a hash value of the information that indicates a storage destination in the core storage region (a location of the core storage region for a file that has been cached). The storage destination of a file is indicated by the URL for instance.

The file entity hash value 12162 is a hash value of a file that has been cached.

The time and date of recall 12163 is the information that indicates the latest date when a recall request of a file was transmitted to the core node 220 (the latest date when a recall of a file has been executed). The recall request is a read request that specifies a file of a link destination of a stub.

FIG. 9B is a view showing a group management table 1217.

The group management table 1217 is provided with a group ID 12171, a group configuration 12172, and a representative flag 12173 for every edge group.

The group ID is an ID of an edge group.

The group configuration 12172 includes an ID of each of the RO edge nodes 120B that configure an edge group.

The representative flag 12173 is a flag that indicates whether each of the RO edge nodes 120B that configure an edge group is a representative node or not. The RO edge node 120B that is corresponded to the representative flag 12173 of "1" is a representative node of an edge group that includes the node 120B. The RO edge node 120B that is corresponded to the representative flag 12173 of "0" is a non-representative node of an edge group that includes the node 120B.

FIG. 9B indicates the following matters for instance:

(*) a group in which the group ID 12171 is "01" is configured by the RO edge nodes 120B1, 120B2, and 120B3; and (*) the representative node of the group is the RO edge node 120B1, and other RO edge nodes 120B2 and 120B3 are non-representative nodes.

The flow of a processing that is executed in the present embodiment will be described in the following.

Figure 10:
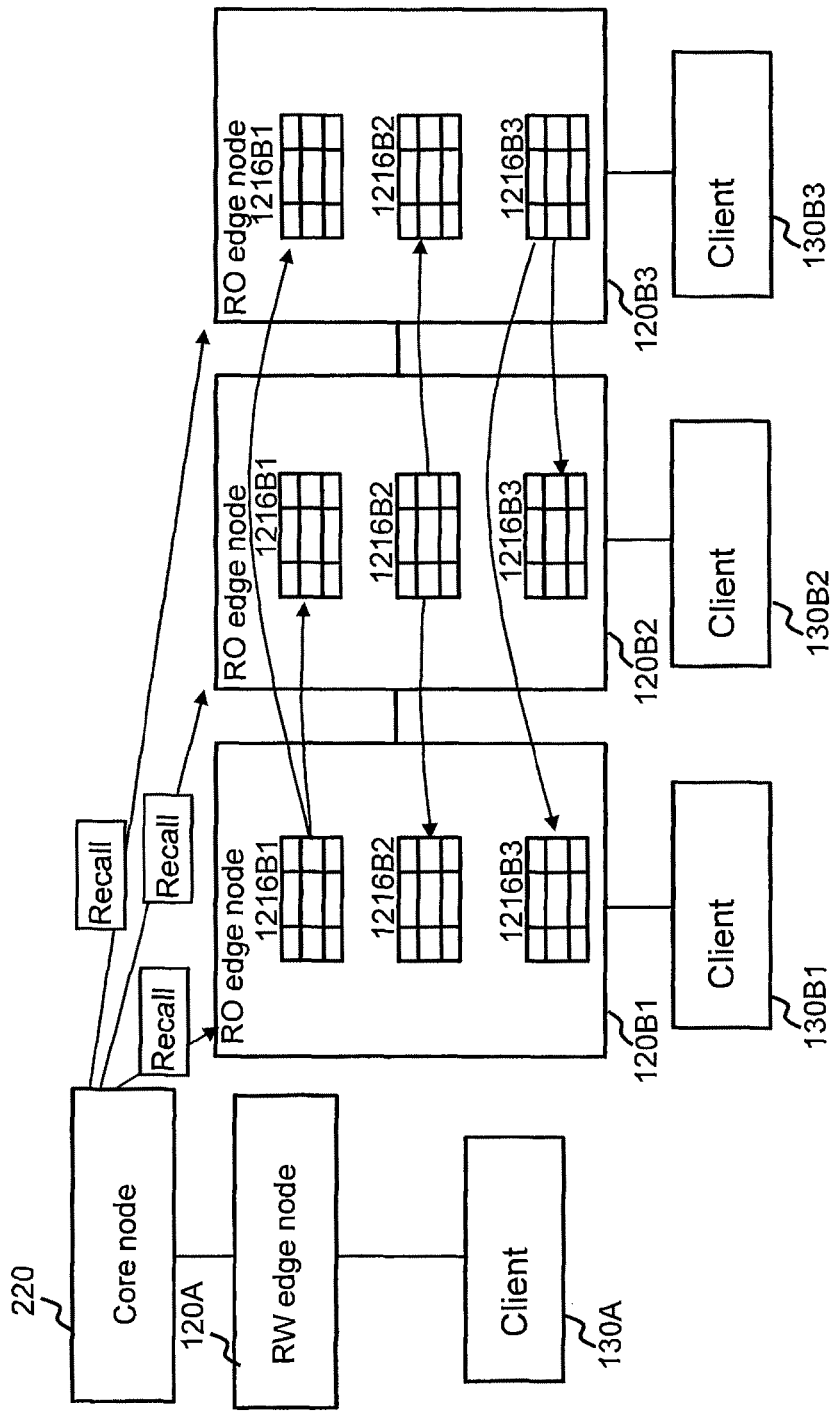
FIG. 10 is a view showing a flow of a processing in which a plurality of RO edge nodes 120B share the storage destination management table 1216.

FIG. 10 is a view showing a flow of a processing in which a plurality of RO edge nodes 120B share the storage destination management table 1216.

For instance, one RW edge node 120A and three RO edge nodes 120B1 to 120B3 are coupled to one core node 220. The clients 130A and 130B1 to 130B3 are coupled to the RW edge node 120A and the RO edge nodes 120B1 to 120B3, respectively.

Figure 4:
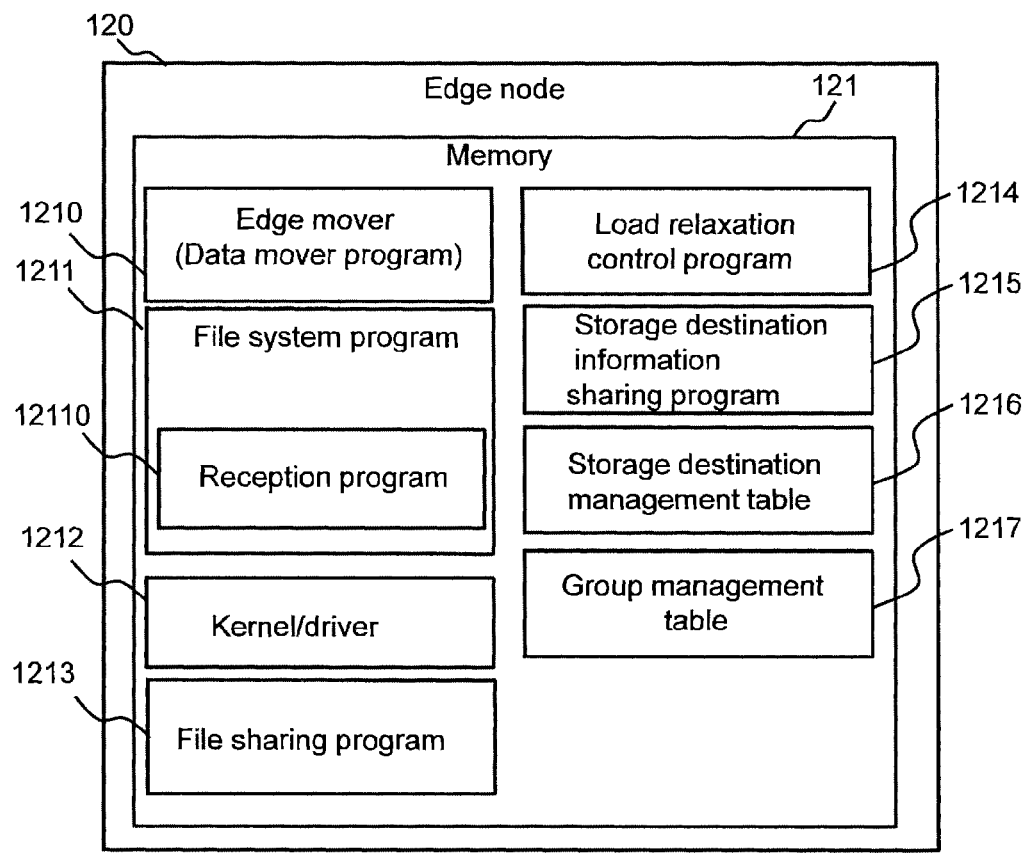
FIG. 4 is a view showing a computer program and information that are included in an edge node 120.

Each of the storage destination management tables 1216 is shared by a plurality of RO edge nodes 120B according to the storage destination information sharing program 1215 that is included in each of the RO edge nodes 120B (see FIG. 4). For instance, the information that is included in the storage destination management table 1216 in the RO edge node 120B1 is copied to all of other the RO edge nodes 120B2 and 120B3. By this configuration, the RO edge nodes 120B2 and 120B3 are provided with the storage destination management table 1216B1 (substantially, a duplicate of the storage destination management table 1216B1 in the RO edge node 120B1).

The similar processing is also executed for the storage destination management table 1216B2 (1216B3) in the RO edge node 120B2 (120B3). By this configuration, each of the RO edge nodes 120B can be provided with not only the storage destination management table 1216 for a file that has been stored into an edge storage region (a file system) that is included in the node 120B but also the storage destination management table 1216 for a file that has been stored into an edge storage region that is included in other node 120B.

It is assumed that all storage destination management tables 1216 are shared by all RO edge nodes 120B. Moreover, it is assumed that a file in a core storage region (hereafter referred to as a file X1) is cached in all edge storage regions.

In this state, it is assumed that a write request is transmitted from the client 130A to the RW edge node 120A, the file X1 that has been stored into an edge storage region of the RW edge node 120A is updated, and the file after the update (hereafter referred to as a file X2) is stored into a core storage region for instance. Moreover, the RO edge node 120B1 executes a recall of the file X2 after the update from the core storage region, caches the file X2 after the update to an edge storage region that is included in the node 120B1, and updates the storage destination management table 1216B1 that is included in the node 120B1.

In this stage, although the file X2 after the update has been cached in the edge storage region that is included in the RO edge node 120B1, the file X1 before an update has been cached in the edge storage region that is included in the RO edge nodes 120B2 and 120B3 and the file X2 after the update has not been cached. In other words, the storage destination management tables 1216B2 and 1216B3 have not been updated.

The RO edge node 120B transmits the information that is included in the storage destination management table 1216 that is corresponded to the node 120B to other RO edge node 120B. The information to be transmitted can be all information that is included in the storage destination management table 1216, or can be only information on the line that has been updated by an execution of a recall of a file.

The RO edge node 120B receives the information that is included in the storage destination management table 1216 that is corresponded to other edge node 120B from the other RO edge node 120B. The RO edge node 120B updates the storage destination management table 1216 that is corresponded to the other edge node 120B.

The RO edge node 120B compares the storage destination management table 1216 that is corresponded to the node 120B with the storage destination management table 1216 that is corresponded to other node 120B. Based on the result of the comparison, the RO edge node 120B can specify whether a file that has been cached is a file after an update or a file before an update.

As described with reference to FIG. 11 for instance, the RO edge node 120B2 can specify a file in which a file entity hash value 12162 is xxxyyy123 is a file before an update among three files that have been cached by the RO edge node 120B2 by comparing tables 1216B1 and 1216B2 that are included in the RO edge node 120B2. More specifically, the RO edge node 120B2 executes the following processing for instance:

(a) selecting at least two files that are provided with the same file storage destination hash value 12161;

(b) comparing the file entity hash values 12162 with each other for the at least two files that have been selected in (a);

(c) comparing the time and date of recall 12163 for the at least two files that have been selected in (a) in the case in which the file entity hash values 12162 are different from each other; and (d) specifying a file in which the time and date of recall 12163 are older as a file before an update.

Consequently, in accordance with the example shown in FIG. 11, it is specified that a file in which a file entity hash value 12162 is xxxyyy123 is a file before an update.

The RO edge node 120B2 creates a stub for only a file before an update and does not create a stub for a file after an update. A file in which a stub is created is limited to a file before an update among a plurality of files that have been cached. Consequently, the number of accesses to the core node 220 can be suppressed. In other words, in the case in which the RO edge node 120B2 receives a read request that specifies a stub, the RO edge node 120B2 transmits a recall request (a read request) of a file of a link destination of the stub to the core node 220. However, since a file in which a stub is created is limited to a file before an update, the number of transmissions of a recall request to the core node 220 can be suppressed.

Moreover, in the case in which the RO edge node 120B receives a read request that specifies a file that has been cached from the client 130B2, the RO edge node 120B transmits the file that has been cached to the client 130B2. However, since it is expected that the file that has been cached is only a file after an update, it can be expected that a file before an update is not returned to the client 130B2.

In accordance with one ingenuity for suppressing the number of accesses to the core node 220 (hereafter referred to as an ingenuity 1), a file before an update is specified among at least one file that has been cached, and a stub is created for only a file after the update.

The present embodiment is also provided with another ingenuity 2 for suppressing the number of accesses to the core node 220. In accordance with the ingenuity 2, at least one edge group that is configured by at least one RO edge node 120B is created. Even in the case in which the RO edge node 120B receives a read request that specifies a stub, it is expected that the RO edge node 120B does not transmit a recall request (a read request) to the core node 220, obtains a file after an update (a latest file) that is corresponded to the stub, and returns the file after an update. More specifically, the RO edge node 120B can judge whether or not a file after an update that is corresponded to the stub that has been specified by a read request has already been cached to an edge storage region that is included in other node 120 in an edge group that includes the node 120B based on the storage destination management table 1216 that is corresponded to other node 120B. In the case in which a core storage destination (a storage destination in a core storage region) that is corresponded to the stub is equivalent to a core storage destination of a file that has been cached in an edge storage region that is included in other node 120B, it is decided that a file after an update that is corresponded to the stub has been cached in an edge storage region that is included in other node 120B in an edge group. In the case in which the result of the judgment is positive, the RO edge node 120B can obtain the file from other node 120B and return the file to the client 130B.

In other words, in the case in which a file that has been received from the client 130B by the RO edge node 120B and that has been specified by a read request has been cached in an edge group that includes the node 120B, a recall request is not issued from the node 120B, and the file has been cached is transmitted to the client 130B.

Consequently, in the case in which many files have been cached in one edge group as much as possible and duplicated files are included in the files as less as possible, it is thought that a probability of an issuance of a recall request is low.

An edge group is created according to such an aspect. The creation processing of an edge group will be described in the following.

In the creation processing of an edge group, the following processing is executed:

(a) a selection of a representative node; and (b) an allocation for every non-representative node.

By the above configuration, at least one edge group is created. The edge group is configured by one representative node and at least zero non-representative node.

The selection of a representative node is executed as described in the following.

The RO edge node 120B (the load relaxation control program 1214) refers to all the storage destination management tables 1216 in the node 120B, and specifies an RO edge node 120B that satisfies both (or one) of the following two conditions:

(Condition 1) an amount of cache is equal to or larger than a certain value; and (Condition 2) an amount of duplicated files is equal to or larger than a certain value.

The specified node 120B is selected as a representative node.

The amount of cache described above can be the total amount of at least one file that has already been cached (for instance, a total size, a total number, or a rate (a total size of at least one file that has already been cached to a capacity of a whole or a predetermined part of an edge storage region (a file system))).

The amount of duplicated files described above is a file that is corresponded to the following (A) and (B) among at least one file that has been cached in an edge storage region that is included in the node 120B (it can be specified whether a storage destination is equivalent to each other or not based on the storage destination management table 1216 of each of the RO edge nodes 120B).

(A) a core storage destination is equivalent to a core storage destination of a file that has been cached in an edge storage region that is included in other RO edge node 120B; and (B) duplicated by a file that has been cached in an edge storage region that is included in other RO edge node 120B (the content is the same).

Consequently, in the case in which a file that has been cached for a node 120B1 and a file that has been cached for a node 120B2 are duplicated by each other for instance, it is said that a duplicated file exists for the node 120B1 and the node 120B2.

The amount of duplicated files described above can be the total amount of at least one duplicated file (for instance, a total size, a total number, or a rate to an amount of cache (a total number of at least one duplicated file to a total number of at least one file that has already been cached)).

The Condition 1 and Condition 2 described above conform to the above described aspect.

More specifically, as described above, it is preferable that many files have already been cached in an edge group as much as possible. However, there is a possibility that an RO edge node 120B other than a representative node does not exist in the edge group. Consequently, it is preferable that an RO edge node 120B that is provided with a larger amount of cache is selected as a representative node. Therefore, the Condition 1 is adopted as one condition of a representative node.

Moreover, as described above, it is preferable that there are many files that are provided with different contents (duplicated files are included as less as possible). An edge group exists for every representative node. Consequently, it is preferable that at least two RO edge nodes 120B that are provided with many duplicated files exist in separate edge groups. Therefore, the Condition 2 is adopted as one condition of a representative node.

An amount of cache and an amount of duplicated files can be calculated based on the storage destination management table 1216.

For instance, an amount of cache can be the number of files that have already been cached, which is specified by the storage destination management table 1216. In the example shown in FIG. 11, for the RO edge node 120B1, it is found that the number of files that have already been cached is 3 from the storage destination management table 1216B1. Consequently, an amount of cache can be 3 for the RO edge node 120B1.

The duplicated file is one of at least two files in which a combination of a file storage destination hash value 12161 and a file entity hash value 12162 conforms to each other. In other words, in the example shown in FIG. 11, there is a file that is corresponded to a combination of a file storage destination hash value 12161 aaabbb123 and a file entity hash value 12162 xxxyyy456 (hereafter referred to as a file K1) as a file that has already been cached for the node 120B1. It is also found that there is a file that is corresponded to a combination of a file storage destination hash value 12161 aaabbb123 and a file entity hash value 12162 xxxyyy456 (hereafter referred to as a file K2) as a file that has already been cached for the node 120B2. In this case, the file K1 is a duplicated file for the node 120B1, and the file K2 is a duplicated file for the node 120B2.

After a representative node is selected as described above, a non-representative node (that is, an RO edge node that has not been selected as a representative node) is allocated to any of edge groups. An edge group that is an allocated destination is an edge group in which there are least cached files that are duplicated with a file that has already been cached for the non-representative node among at least two edge groups.

In the case in which an allocation for all non-representative nodes is completed, the creation processing of an edge group is terminated.

A concrete example of the creation processing of an edge group will be described in the following.

The example shown in FIG. 12A indicates the following statuses:
(*) the RO edge node 120B1 is provided with files A to H;
(*) the RO edge node 120B4 is provided with files A to D and J to M;
(*) the RO edge node 120B2 is provided with files L and M;
(*) the RO edge node 120B3 is provided with files D and J; and
(*) the RO edge node 120B5 is provided with files G and H.

In accordance with the Condition 1 and Condition 2 described above, the nodes 120B1 and 120B4 of the nodes 120B1 to 120B5 are representative nodes. The nodes 120B1 and 120B4 of the nodes 120B1 to 120B5 are provided with the largest files that have already been cached and the largest duplicated files A to D.

An edge group 01 that includes a representative node 120B1 and an edge group 04 that includes a representative node 120B4 are prepared. The RO edge nodes 120B2, 120B3, and 120B5 other than a representative node are non-representative nodes. Each of the non-representative nodes is allocated to an edge group in which there are least cached files that are duplicated with a file that has already been cached for the non-representative node. As a result, as shown in FIG. 12A, the non-representative nodes 120B2 and 120B3 are allocated to the edge group 01, and the non-representative node 120B5 is allocated to the edge group 02.

As a result, as shown in FIG. 12B, the edge group 01 is configured by the representative node 120B1 and the non-representative nodes 120B2 and 120B3. Moreover, the edge group 02 is configured by the representative node 120B4 and the non-representative node 120B5.

Consequently, as shown in FIG. 12C, files that have already been cached for the edge group 01 are files A to H, L, M, and J, and files that have already been cached for the edge group 02 are files A to D, J to K, L, G, and H.

In other words, since an edge group is created from an aspect described above, there is a low possibility that a plurality of duplicated files is concentrated to one edge group, and there is a high possibility that a plurality of duplicated files is distributed to a plurality of edge groups. As shown in FIG. 12C, the duplicated files A to D, G, H, J, L, and M exist in both of edge groups 01 and 02. Consequently, in the case in which a node 120B that belongs to any of the edge groups 01 and 02 receives a read request that specifies a stub of any one of the duplicated files, a file that has already been cached that is corresponded to the stub can be obtained from other node 120B in the edge group 01 or 02 that includes the node 120B. Therefore, a recall request is not necessary.

However, in the case in which an edge group is created without conforming to the above aspect, there is a high probability that a recall request is necessary unfortunately.

For instance, as shown in FIG. 13A, it is assumed that an edge group 03 that is configured by nodes 120B2, 120B3, and 120B5 and an edge group 04 that is configured by nodes 120B1 and 120B4 are prepared.

In this case, as shown in FIG. 13B, duplicated files A to D that have already been cached for the node 120B1 and duplicated files A to D that have already been cached for the node 120B4 exist as a file that has already been cached for the same edge group 04, and files A to D do not exist as a file that has already been cached for other edge group 03. In other words, a plurality of duplicated files is not distributed to a plurality of edge groups in a uniform manner and is placed in a disproportionate manner.

Consequently, even in the case in which any node 120B in the edge group 03 receives a read request that specifies a stub of any duplicated file (such as a file A), since there is not a file A as a file that has already been cached in the edge group 03, it is necessary that a recall request is issued.

As described above, in the case in which an edge group is created without conforming to the above aspect, there is a high probability that a recall request is issued unfortunately.

As a result, creating an edge group according to the above described aspect is the ingenuity 2 in accordance with the present embodiment. By this configuration, it is possible to reduce the number of times of an issuance of a recall request. Although both of the ingenuity 1 and the ingenuity 2 is adopted in the present embodiment, it is also possible to reduce the number of times of the accesses to a core node even in the case in which any one of the ingenuity 1 and the ingenuity 2 is adopted.

Figure 14:
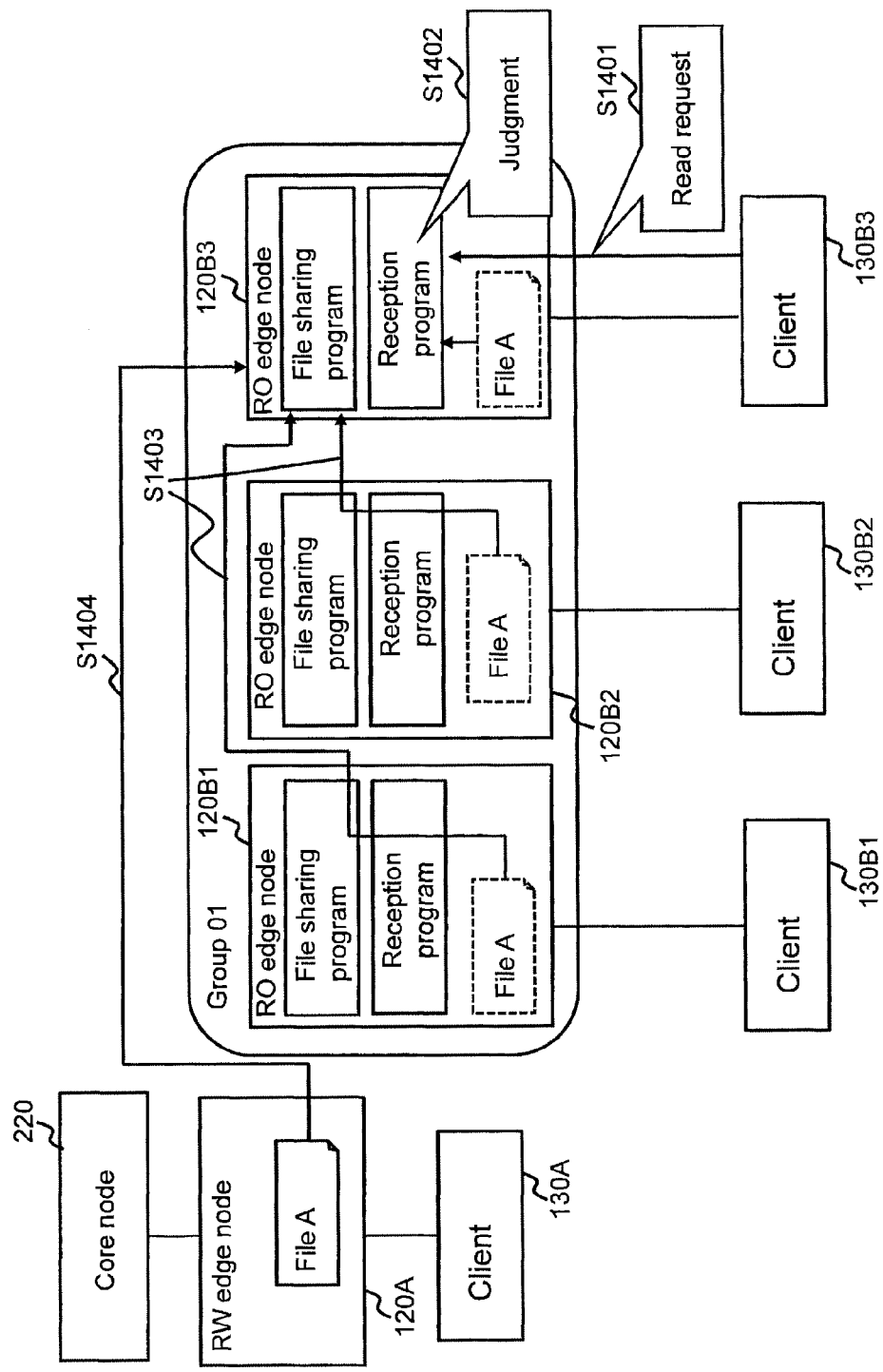
FIG. 14 is a view showing an example of a processing that is executed in the case in which an RO edge node 120B receives a read request that specifies a stub.

FIG. 14 is a view showing an example of a processing that is executed in the case in which an RO edge node 120B receives a read request that specifies a stub.

The edge group 01 is configured by the representative node 120B1 and the non-representative nodes 120B2 and 120B3.

It is assumed that an RO edge node 120B3 receives a read request that specifies a stub of a file A from a client 130B3 (S1401).

In this case, the RO edge node 120B3 judges whether or not the file A that is corresponded to the stub has already been cached to an edge group 01 that includes the node 120B3 based on all of the storage destination management tables 1216 that are included in the node 120B3 (S1402).

In the case in which the result of a judgment of the S1402 is positive, the RO edge node 120B3 obtains the file A that has already been cached from an edge storage region of other node 120B (S1403), and transmits the file A to the client 130B3 (S1405).

In the case in which the RO edge node 120B3 specifies that a plurality of files A that have already been cached that are corresponded to the stub that is specified by the read request exist in the same edge group, the RO edge node 120B3 selects one file A that has already been cached from the plurality of files A that have already been cached. The file A that is selected can be a file that conforms to a predetermined policy. The policy conforms to at least one aspect of (a) a distance from the node 120B3, (b) an access load of other node 120B, and (c) the latest date when other node 120B executes a recall for other node 120B in the edge group 01 for instance. More specifically, the file that is selected is a file that is corresponded to at least one of the following (A) to (C):
(A) a file that has been stored into an edge storage region of other node 120B in which a distance from the node 120B3 is shortest;
(B) a file that has been stored into an edge storage region of a node 120B in which an access load is lowest among at least one other node 120B in the edge group 01; and
(C) a file in which the time and date of recall 12163 is latest (see FIG. 9).

The distance from the node 120B3 can be the number of hops, that is, relay apparatuses that are disposed between the node 120B3 and the other node 120B (such as a router and a switch device that is provided with a function similar to the router). Each of the nodes 120B can be provided with the information that indicates a distance from each of other nodes 120B in an edge group that includes the node 120B. The distance from the node 120B3 can be specified by the information.

The access load of a node 120B can be the number of recalls that have been executed by the node 120B (or a CPU usage rate of the node 120B) for instance.

In the case in which there are at least two files that are corresponded to at least one of the above (A) to (C), a file that satisfies the above (A) to (C) as many as possible can be selected. Moreover, in the case in which there are at least two files that satisfies separate conditions of the above (A) to (C), a file can be selected based on each of the priority levels of the above (A) to (C).

In the case in which the result of a judgment of the S1402 is negative, the RO edge node 120B3 obtains the file A from the RW edge node 120A, and caches the file A in an edge storage region of the node 120B3 (S1404). The node 120B3 then transmits the file A to the client 130B3 (S1405).

The reason why the node 120B3 accesses the RW edge node 120A in the case in which a file that has already been cached and that is corresponded to a stub does not exist in the edge group 01 is in the following. This is because there is a possibility that a file after an update for the RW edge node 120A (a file after an update (the latest file) that is corresponded to a stub and that exists in an edge storage region of the RW edge node 120A) is not reflected to a core node 220 (is not migrated to a core node 220) in the case in which a file that has already been cached and that is corresponded to a stub does not exist in the edge group 01. In other words, it is thought that there is a high possibility that a file after an update (the latest file) that is corresponded to a stub can be obtained in the case in which the node 120B3 transmits a read request of a file that is corresponded to a stub to not the core node 220 but the RW edge node 120A in this case. Moreover in this case, since a read request is transmitted to not the core node 220 but the RW edge node 120A, a load of the core node 220 can be reduced.

The processing that is executed by each of the programs will be described in the following. In the following descriptions, an edge mover that is executed by the RW edge node 120A is referred to as an RW mover, and an edge mover that is executed by the RO edge node 120B is referred to as an RO mover.

Figure 15:
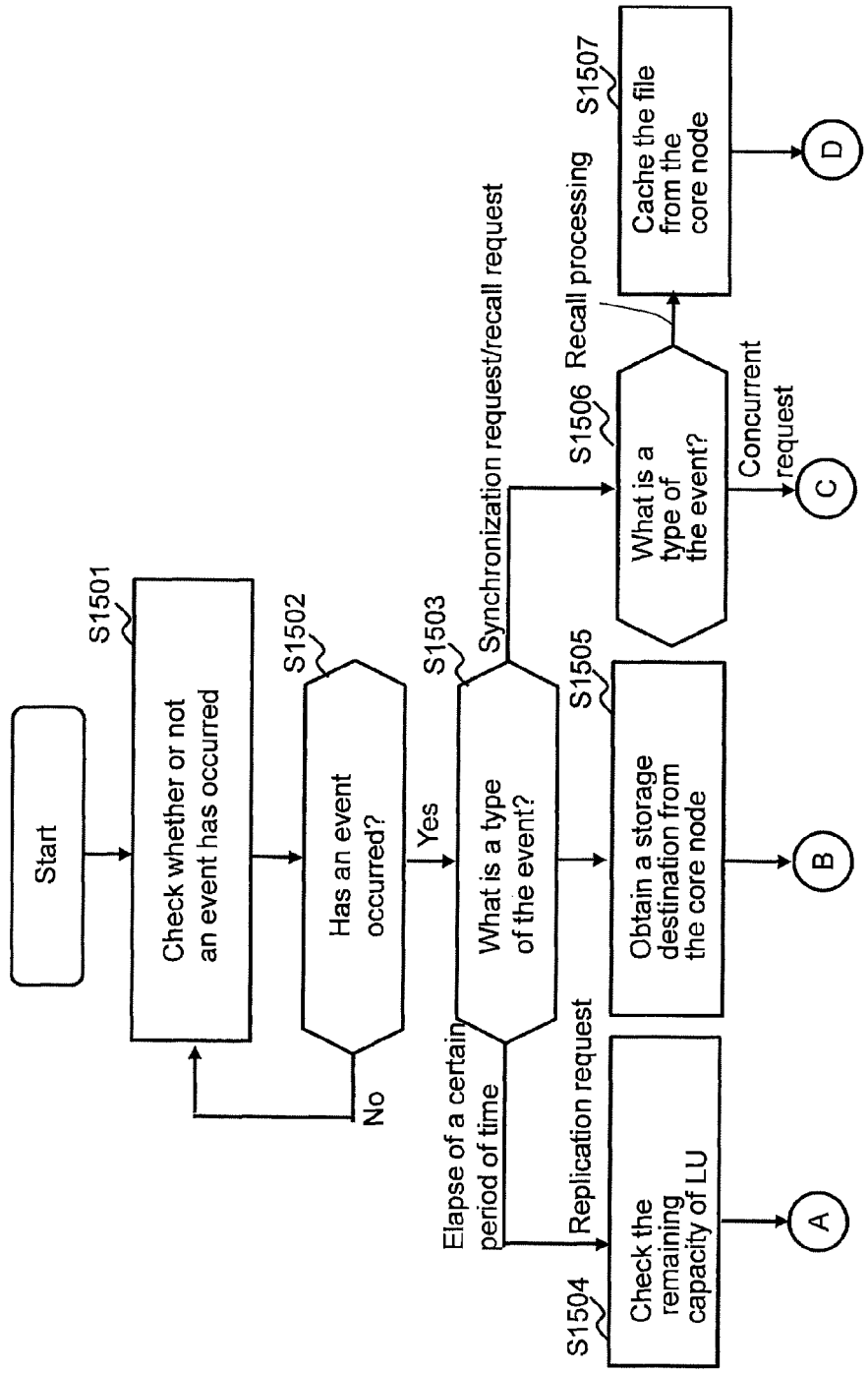
FIG. 15 is a part of a flowchart showing a flow of a processing of an RW mover 1210.
Figure 16:
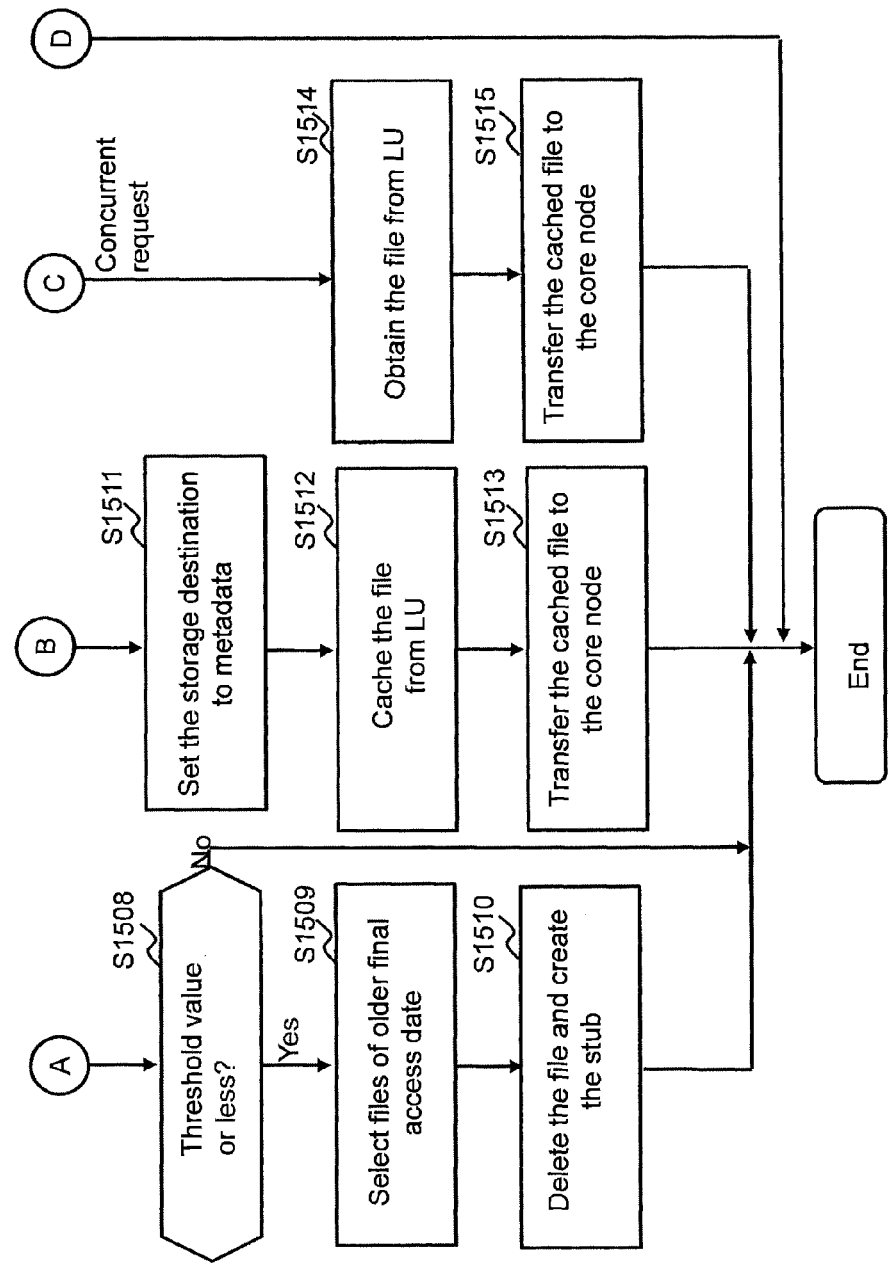
FIG. 16 is a remaining part of the flowchart of FIG. 15.

FIG. 15 is a part of a flowchart showing a flow of a processing of an RW mover 1210. FIG. 16 is a remaining part of the flowchart of FIG. 15. In the descriptions of FIG. 15 and FIG. 16, the RW edge node 120A that executes the RW mover 1210 is referred to as a target node 120A, and an edge storage region that is included in the target node 120A is referred to as an RW edge storage region.

The RW mover 1210 checks whether or not an event has occurred (S1501). The event means any one of an elapse of a certain period of time, a replication request, a synchronization request, and a recall request.

The elapse of a certain period of time means an elapse of a certain period of time after the S1501 is terminated.

The replication request means a request of a replication of a file from the RW edge storage region to the core storage region.

The synchronization request means a request of a synchronization of a file to which a replication from the RW edge storage region to the core storage region has been executed (a file in the core storage region) and a file that has been updated by the RW edge node 120A (that is, a request of writing a file after an update in the RW edge storage region to a file in the core storage region).

The recall request means a request of reading a file from the core storage region as described before.

The RW mover 1210 can receive at least one of a replication request, a synchronization request, and a recall request from an apparatus other than the RW edge node 120A (for instance, a client), and can also receive that from other program in the RW edge node 120A.

In the next place, in the case in which the RW mover 1210 decides that an event has not occurred (S1502: No), S1501 is executed.

In the case in which the RW mover 1210 decides that an event has occurred (S1502: Yes), the RW mover 1210 judges a type of the event that has occurred (S1503).

In the case in which a type of the event is an elapse of a certain period of time, the RW mover 1210 checks the remaining capacity of an LU 1101 (an RW edge storage region (file system)) (S1504). The remaining capacity of an LU 1101 is a free capacity (a capacity that can be used) of an LU 1101 that has been provided to the target node 120A.

In the case in which the remaining capacity of an LU 1101 is larger than a threshold value (S1508: No), the RW mover 1210 terminates the processing.

In the case in which the remaining capacity of an LU 1101 is equal to or less than a threshold value (S1508: Yes), the RW mover 1210 selects files of older final access date in order until the remaining capacity of an LU 1101 (a file system) exceeds a threshold value (S1509).

The RW mover 1210 deletes a file and creates the stub of the deleted file for all files that have been selected in the S1509 (S1510).

In the case in which a type of the event is a replication request, the RW mover 1210 obtains the information that indicates a storage destination of a file of a replication target from the core node 220 (S1505).

The RW mover 1210 sets the information of the storage destination that has been obtained in the S1505 to the metadata of a file of a replication target (S1511).

The RW mover 1210 obtains an object (a file or a directory) that is specified by a replication request and the metadata of the object from the LU 1101 (an RW edge storage region) (S1512).

The RW mover 1210 transfers the object and the data that have been obtained in the S1512 to the core node 220 (S1513). By this step, the object (a file or a directory) that has been obtained in the S1512 is stored into the core storage region.

In the case in which a type of the event is a synchronization request or a recall request, the RW mover 1210 checks whether the type of the event is a synchronization request or a recall request (S1506).

In the case in which a type of the event is a synchronization request, the RW mover 1210 obtains an object that has been updated after the replication and its metadata from the LU 1101 (an RW edge storage region) (S1514).

The RW mover 1210 transfers the object that has been obtained and its metadata to the core node 220 (S1515). By this step, a file that has been updated by the RW edge node 120A (a file in the RW edge storage region) is reflected to the core storage region.

In the case in which a type of the event is a recall request, the RW mover 1210 checks reads a file that is linked to a stub from the core node 220 (the core storage region) and caches the file to the RW edge storage region (S1507).

Figure 17:
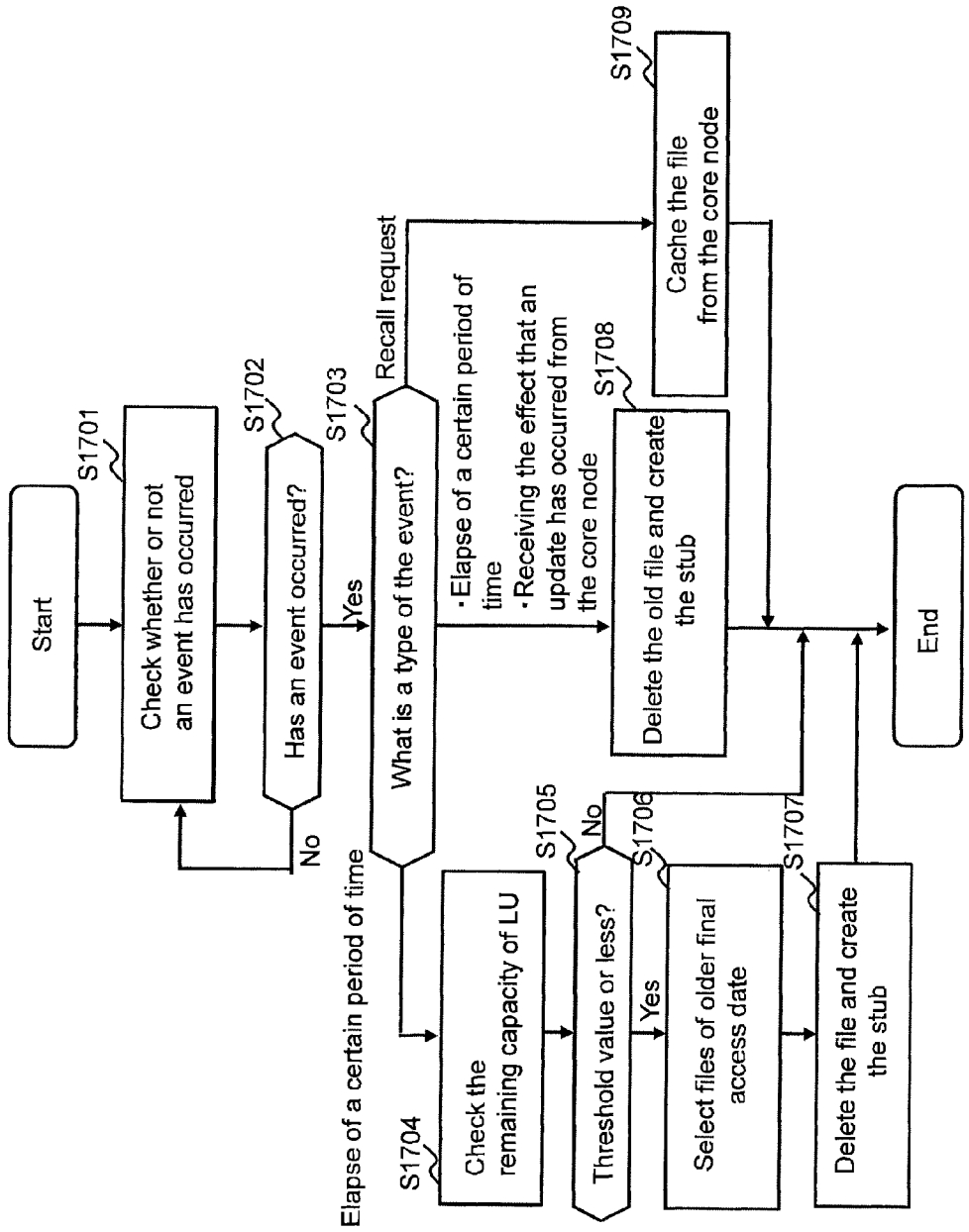
FIG. 17 is a part of a flowchart showing a flow of a processing of an RO mover 1210.

FIG. 17 is a flowchart showing a flow of a processing of an RO mover 1210. In the descriptions of FIG. 17, the RO edge node 120B that executes the RO mover 1210 is referred to as a target node 120B, and an edge storage region that is included in the target node 120B is referred to as an RO storage region.

The RO mover 1210 checks whether or not an event has occurred (S1701). The event means any one of a first elapse of a certain period of time, a second elapse of a certain period of time, receiving the effect that an update has occurred from the core node, and a recall request.

The first elapse of a certain period of time means an elapse of a certain period of time after the S1701 is terminated.

The second elapse of a certain period of time means an elapse of a certain period of time after the S1708 is terminated.

Receiving the effect that an update has occurred from the core node means a reception of the information that indicates that a file that has been stored into the core storage region and that is corresponded to a stub that is included in the target node 120B has been updated.

In the case in which an event has not occurred (S1702: No), the RO mover 1210 executes the S1701.

In the case in which an event has occurred (S1702: Yes), the RO mover 1210 judges a type of the event that has occurred (S1703).

In the case in which a type of the event is a first elapse of a certain period of time, the RO mover 1210 checks the remaining capacity of an LU 1101 (an RO edge storage region (file system)) (S1704).

In the case in which the remaining capacity of an LU 1101 is larger than a threshold value (S1705: No), the RO mover 1210 terminates the processing.

In the case in which the remaining capacity of an LU 1101 is equal to or less than a threshold value (S1705: Yes), the RO mover 1210 selects files of older final access date in order until the remaining capacity of an LU 1101 exceeds a threshold value (S1706).

The RO mover 1210 deletes a file and creates the stub of a file for all files that have been selected in the S1706 (S1707).

In the case in which a type of the event is a first elapse of a certain period of time or receiving the effect that an update has occurred from the core node, the RO mover 1210 executes the following processing (S1708):

(S1708-1) judging whether or not a file before an update exists in at least one file that has already been cached in the RO edge storage region based on all of the storage destination management tables 1216 that are included in the target node 120B; and (S1708-2) deleting the file before an update and creating a stub that is corresponded to a file after an update that has been stored into the core storage region in the case in which the result of a judgment of the S1708-1 is positive.

In the case in which a type of the event is a recall request, the RO mover 1210 reads a file that is linked to a stub from the core node 220 (the core storage region) and caches the file to the RW edge storage region (S1709). After the file is cached, the RO mover 1210 updates the file entity hash value 12162 and the time and date of recall 12163 that are corresponded to the file that has been cached for the storage destination management table 1216 that is corresponded to the target node 120B. The information that includes the file entity hash value 12162 and the time and date of recall 12163 after the update is transmitted to all other RO edge nodes 120B.

Figure 18:
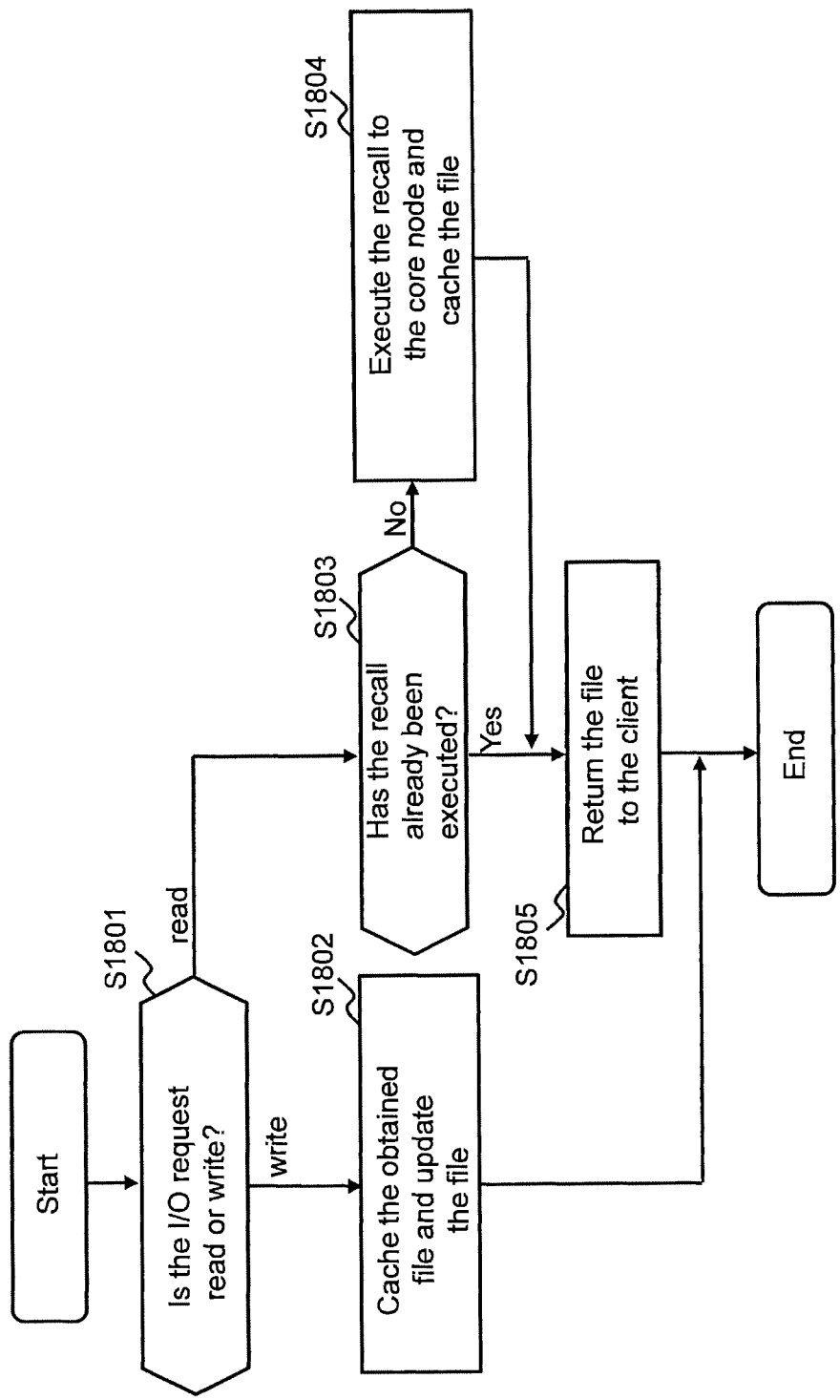
FIG. 18 is a flowchart showing a flow of a processing that is executed by a reception program 22110 of an RW edge node 120A.

FIG. 18 is a flowchart showing a flow of a processing that is executed by a reception program 22110 of an RW edge node 120A. In the descriptions of FIG. 18, the reception program is referred to as an RW reception program, the RW edge node 120A is referred to as a target node 120A, and an edge storage region that is included in the target node 120A is referred to as an RW storage region.

The RW reception program 22110 receives an I/O request from the client 130A and judges a type of the I/O request (S1801).

In the case in which an I/O request is a write request, the RW reception program 22110 executes the following processing (S1802):

(S1802-1) making the edge mover 1210 of the target node 120A to execute a recall of a file that is corresponded to the file accompanying the write request from the core storage region;

(S1802-2) storing the file that has been obtained in the S1802-1 into the RW edge storage region; and (S1802-3) writing the file accompanying the write request to the file that has been stored into the RW edge storage region in the S1802-2 (updating the file).

At this point of time, the file after the update in the S1802 (the file that has been written in accordance with the write request) has not been written to the core storage region. Consequently at this point of time, the latest file exists in not the core storage region but the RW edge storage region only. In this state, there is not a file that has already been cached of a read target in an edge group as described above, the latest file is read from the target node 120A by transmitting a read request of the file to the target node 120A.

In the case in which an I/O request is a read request, the RW reception program 22110 judges whether or not a file that is specified by the read request has already been recalled (cached) (S1803).

In the case in which the result of a judgment of the S1803 is positive (S1803: Yes), the RW reception program 22110 returns a file that has been recalled (a file that has already been cached) to the client 130A (S1805).

In the case in which the result of a judgment of the S1803 is negative (S1803: No), the RW reception program 22110 executes the following processing (S1804):

(S1804-1) making the edge mover 1210 of the target node 120A to execute a recall of a file that is specified by the read request (a file that is corresponded to the stub that is specified by the read request) from the core storage region; and (S1804-2) storing the file that has been obtained in the S1804-1 into the RW edge storage region.

The RW reception program 22110 returns a file that has been obtained in the S1804 to the client 130A (S1805).

Figure 19:
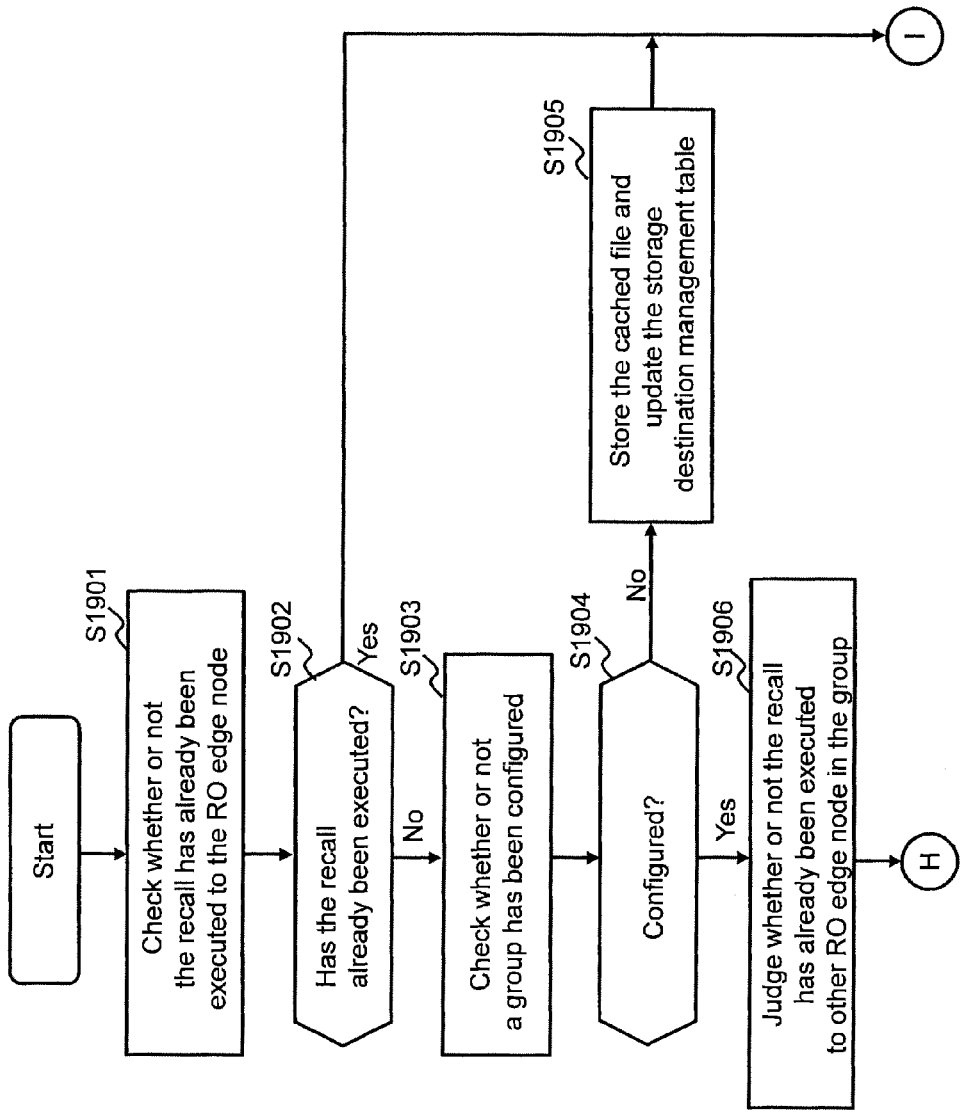
FIG. 19 is a part of a flowchart showing a flow of a processing that is executed by a reception program 12110 of an RO edge node 120B.
Figure 20:
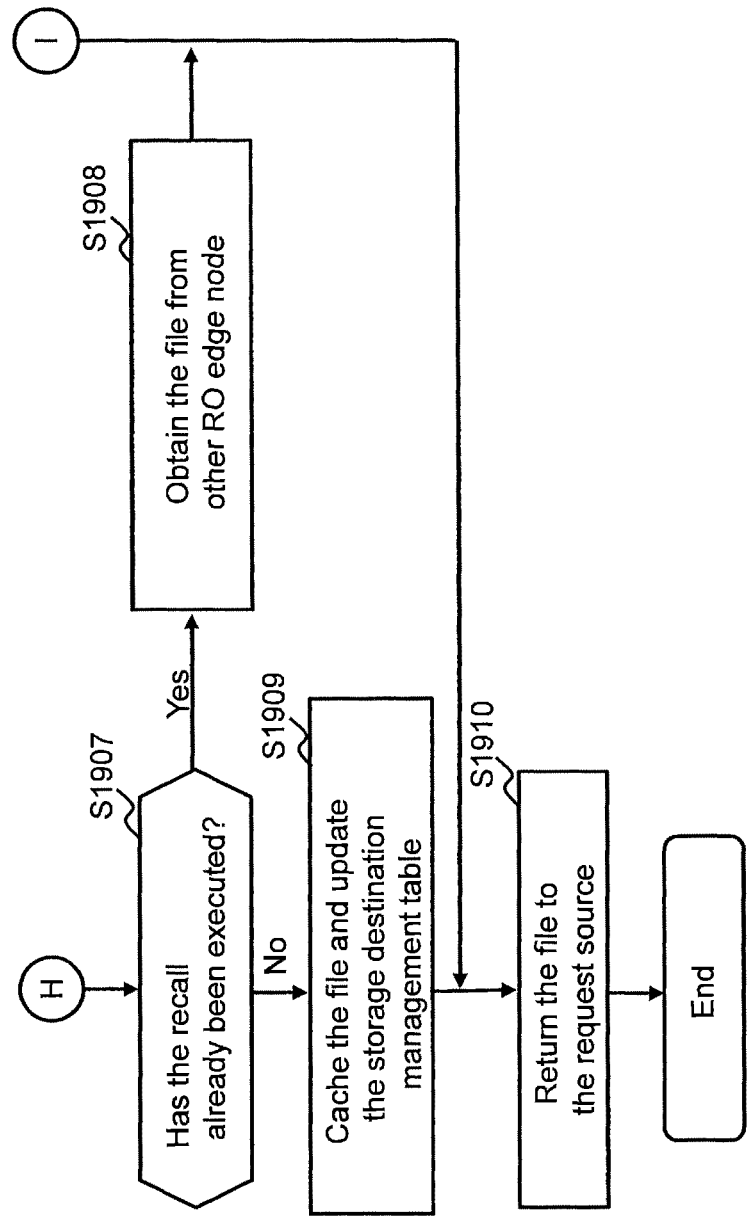
FIG. 20 is a remaining part of the flowchart of FIG. 19.

FIG. 19 is a part of a flowchart showing a flow of a processing that is executed by a reception program 12110 of an RO edge node 120B. FIG. 20 is a remaining part of the flowchart of FIG. 19. In the descriptions of FIG. 19 and FIG. 20, the reception program is referred to as an RO reception program, the RO edge node 120B that executes the reception program is referred to as a target node 120B, an edge storage region that is included in the target node 120B is referred to as an RO edge storage region, and an edge group that includes the target node 120B is referred to as a target group.

In the case in which the RO reception program 22110 receives a read request from the client 130, the RO reception program 22110 judges whether or not a file that is specified by the read request has already been recalled (cached) (S1901).

In the case in which the result of a judgment of the S1901 is positive (S1902: Yes), the RO reception program 22110 returns a file that has already been recalled (a file that has already been cached) to the client 130B (S1905).

In the case in which the result of a judgment of the S1901 is negative (S1902: No), the RO reception program 22110 judges whether or not there is a target group based on a group configuration table 1217 in the target node 120B (S1903).

In the case in which the result of a judgment of the S1903 is negative (S1904: No), the RO reception program 22110 executes the following processing (S1905):

(S1905-1) making the edge mover 1210 of the target node 120B to execute a recall of a file that is specified by the read request (a file that is corresponded to the stub that is specified by the read request) from the core storage region;

(S1905-2) caching the file that has been obtained in the S1905-1 (storing the file that has been obtained in the S1905-1 into the RO edge storage region); and (S1905-3) registering the information related to the file that has been cached in the S1905-2 to the storage destination management table 1216 that is corresponded to the target node 120B.

In the case in which the result of a judgment of the S1903 is positive (S1904: Yes), the RO reception program 22110 judges whether or not a file that is corresponded to the stub that is specified by the read request has already been cached in the target group (S1906). More specifically, the RO reception program 22110 executes the following processing:

(S1906-1) specifying all other RO edge nodes 120B that are included in an edge group that includes the target node 120B based on the group management table 1217; and (S1906-2) judging whether or not a file that is corresponded to the stub that is specified by the read request exists based on the storage destination management table 1216 that is corresponded to the all other RO edge nodes 120B that have been specified in the S1906-1 among all the storage destination management tables 1216 that are included in the target node 120B.

In the case in which the result of a judgment of the S1906 is positive (S1907: Yes), the RO reception program 22110 executes the following processing (S1908):

(S1908-1) obtaining a file that is corresponded to the stub from other RO edge node 120B in the target group;

(S1908-2) caching the file that has been obtained in the S1908-1 (storing the file that has been obtained in the S1908-1 into the RO edge storage region); and (S1908-3) updating the information that is corresponded to the file that has been cached in the S1908-2 in the storage destination management table 1216 that is corresponded to the target node 120B.

In the case in which at least two files that are corresponded to the stub that is specified by the read request have already been cached in the target group, the RO reception program 22110 obtains a predetermined policy, for instance, a file that is corresponded to at least one of the following three files:

(*) a file in which the time and date of recall 12163 is latest;

(*) a file in which other node 120B in which a distance from the target node 120B is shortest (for instance, an RO edge node in which the number of hops described above is least) has already been cached; and (*) a file in which an RO edge node 120B in which the number of times of recall is least has already been cached.

In the case in which the result of a judgment of the S1906 is negative (S1907: No), the RO reception program 22110 executes the following processing (S1909):

(S1909-1) transmitting a read request of a file of a read target to the RW edge node 120A (that is, obtaining a file of a read target from the RW edge node 120A);

(S1909-2) caching the file that has been obtained in the S1909-1 (storing the file that has been obtained in the S1909-1 into the RO edge storage region); and (S1909-3) updating the information that is corresponded to the file that has been cached in the S1909-2 in the storage destination management table 1216 that is corresponded to the target node 120B.

The RO reception program 22110 returns a file of a read target that has been cached in the RO edge storage region to the client 130B (S1910).

Figure 21:
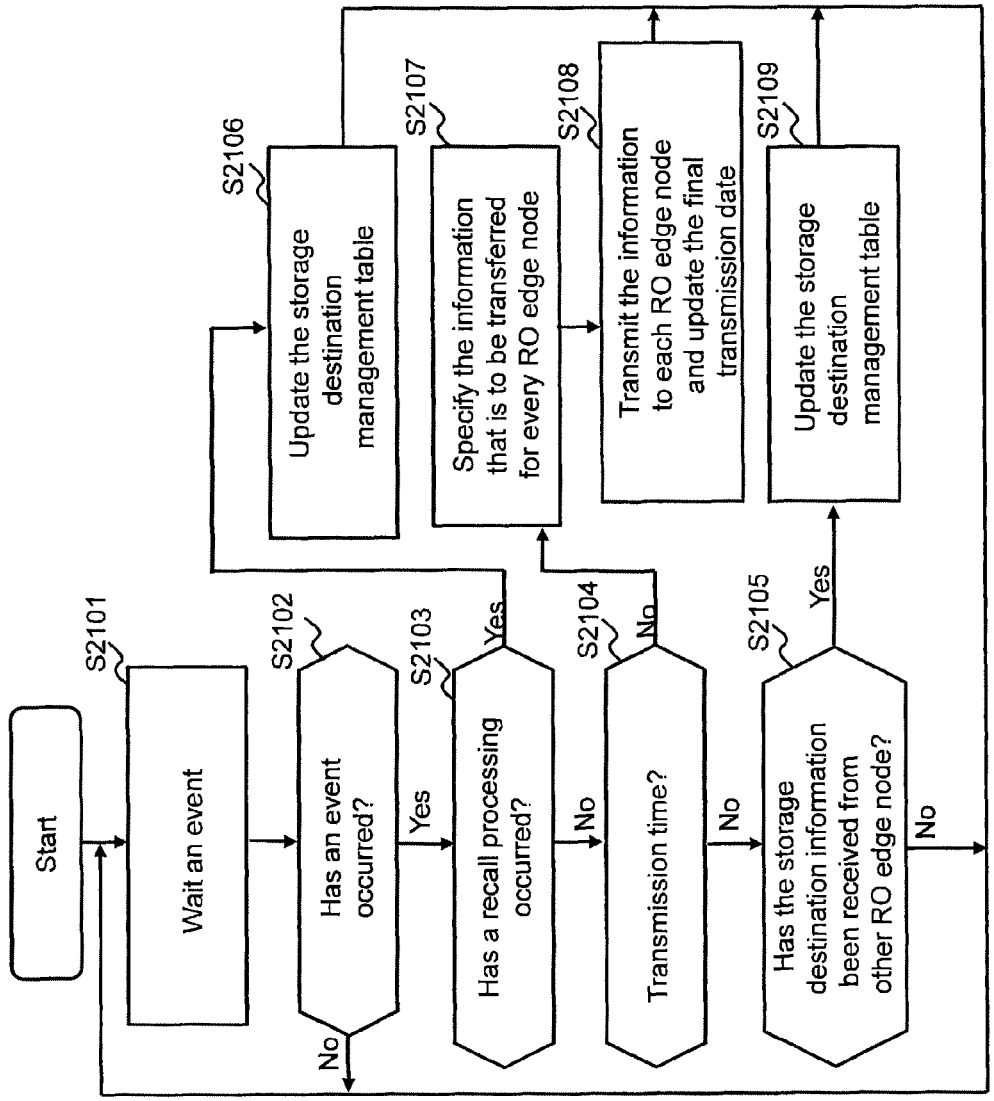
FIG. 21 is a flowchart showing a flow of a processing that is executed by a storage destination information sharing program 1215.

FIG. 21 is a flowchart showing a flow of a processing that is executed by a storage destination information sharing program 1215. In the descriptions of FIG. 21, the RO edge node 120B that executes the program 1215 is referred to as a target node 120B.

The storage destination information sharing program 1215 waits till an event occurs (S2101). The event means any one of a "recall processing", an "advent of a transmission time", and "receiving the storage destination information from other RO edge node".

The program 1215 checks whether or not an event has occurred (S2102). In the case in which an event has not occurred (S2102: No), the program 1215 executes the S2101.

In the case in which a recall processing by other program has not occurred (S2103: Yes), the program 1215 updates a line of the storage destination management table 1216 that is corresponded to the file that has been recalled and that has been cached in the edge storage region (S2106). In other words, although the program that has executed a recall updates the storage destination management table 1216, the program that has executed a recall can call the storage destination information sharing program 1215, and the program 1215 can update the storage destination management table 1216.

In the case in which the current time is a transmission time (S2103: No, S2104: Yes), the program 1215 specifies the storage destination information to be transferred (the information of the storage destination management table 1216) for every RO edge node 120B (S2107). More specifically, the program 1215 compares the final transmission date when the storage destination management information is transmitted to other RO edge node 120B with the time and date of recall 12163 of the storage destination management table 1216 for every file that has already been cached for instance. The information that is included in a line (a line of the storage destination management table 1216) that is corresponded to a file that has already been cached in which the time and date of recall 12163 is later than the final transmission date is the information that has not been transferred to other RO edge node 120B. The information that indicates the final transmission date for every file that has already been cached can be managed by the storage destination management table 1216, or can also be managed by a table other than the storage destination management table 1216.

The program 1215 transfers the information (the storage destination information) that has been specified in the S2107 to all other RO edge nodes 120B (S2106). By this configuration, the storage destination management table 1216 that is corresponded to the target node 120B is updated for all other RO edge nodes 120B.

In the case in which the storage destination information is received from other RO edge node 120B (S2103: No, S2104: No, S2105: Yes), the program 1215 writes the storage destination information that has been received to the storage destination management table 1216 that is corresponded to other RO edge node that has transmitted the information (S2109).

Figure 22:
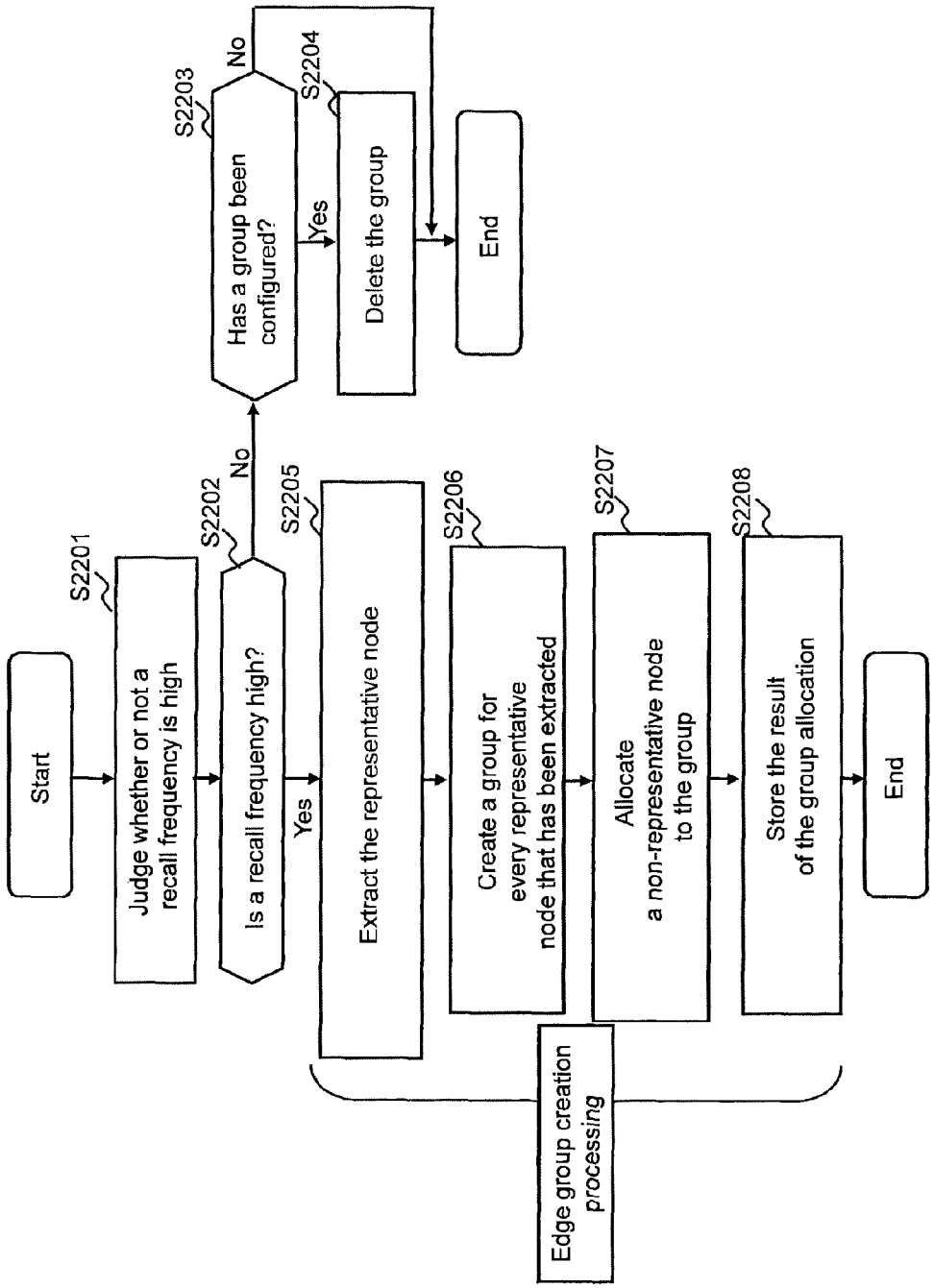
FIG. 22 is a flowchart showing a flow of a processing that is executed by a load relaxation control program 1214.

FIG. 22 is a flowchart showing a flow of a processing that is executed by a load relaxation control program 1214. In the descriptions of FIG. 22, the RO edge node 120B that executes the program 1214 is referred to as a target node 120B, and an edge storage region that is included in the target node 120B is referred to as an RO storage region.

The load relaxation control program 1214 judges whether or not there is an RO edge node 120B in which a recall frequency is high based on all of the storage destination management tables 1216 that are included in the target node 120B (S2201). This can be judged based on whether or not the number of lines of the storage destination management table 1216 is equal to or larger than a predetermined value. In the case in which the number of lines of the storage destination management table 1216 is equal to or larger than a predetermined value, it is judged that a recall frequency is high. On the other hand, in the case in which the number of lines of the storage destination management table 1216 is less than a predetermined value, it is judged that a recall frequency is low. A level of a recall frequency can also be judged as described in the following as substitute for or in addition to the number of lines of the storage destination management table 1216. That is, a count value that indicates the number of times of recall (a count value that is reset to an initial value (such as zero) for every certain period of time) is set, and a level of a recall frequency can be judged based on whether or not the count value is equal to or larger than a predetermined value.

In the case in which the result of a judgment of the S2201 is negative (S2202: No), the program 1214 judges whether or not an edge group has already been configured based on the group management table 1217 (S2203). In the case in which an edge group has not been configured (S2203: No), the program 1214 terminates the processing. In the case in which an edge group has been configured (S2203: Yes), the program 1214 deletes all edge groups (or only an edge group that is configured by only at least one RO edge node in which a recall frequency is less than a predetermined value) (S2204). The deletion of an edge group means a deletion of the information that is included in the group management table 1217 for instance.

In the case in which the result of a judgment of the S2201 is positive (S2202: Yes), the program 1214 executes an edge group creation processing that is configured by the S2205 to S2208.

In other words, the program 1214 specifies at least two RO edge nodes 120B in which an amount of cache is equal to or larger than a certain value and an amount of duplicated files is equal to or larger than a certain value as a representative node based on all of the storage destination management tables 1216 that are included in the target node 120B (S2205).

The program 1214 creates a group for every representative node that has been specified (S2206). For instance, the program 1214 registers the information related to a group for every representative node to the group management table 1217.

The program 1214 allocates each of the non-representative nodes to the edge group in which files that have already been cached are duplicated with a file that has already been cached for the non-representative node as less as possible based on the storage destination management table 1216 of each of the representative nodes and the storage destination management table 1216 of at least one non-representative node (S2207).

The program 1214 registers the result of the S2207 to the group management table 1217 (S2208).

In accordance with the example shown in FIG. 22, in the case in which it is specified that there is an RO edge node 120B in which a recall frequency is high, an edge group is created. However, a reorganization of an edge group (deleting all of the edge groups and executing an edge group creation processing again) can also be executed for every certain period of time.

Embodiment 2

An embodiment 2 in accordance with the present invention will be described in the following. In the descriptions, points that are different from the embodiment 1 will be described in large part, and the detailed descriptions of elements equivalent to those of the embodiment 1 are omitted or simplified.

Figure 23:
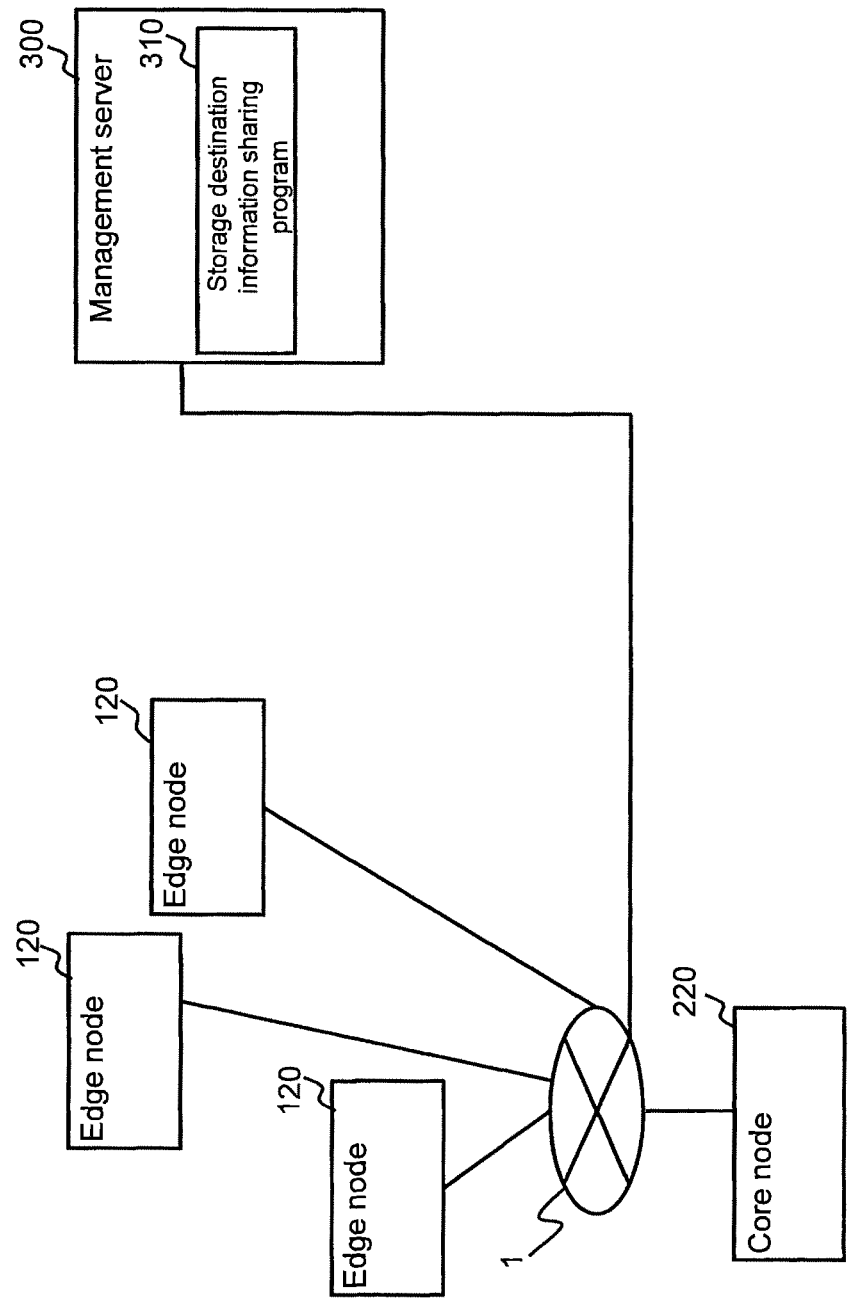
FIG. 23 is a view showing a hardware configuration of an entire system in accordance with an embodiment 2 of the present invention.

As shown in FIG. 23, in the embodiment 2, a management server 300 that are coupled to all of edge nodes 120 is disposed. The management server 300 is provided with a storage destination information sharing program 310.

Figure 24:
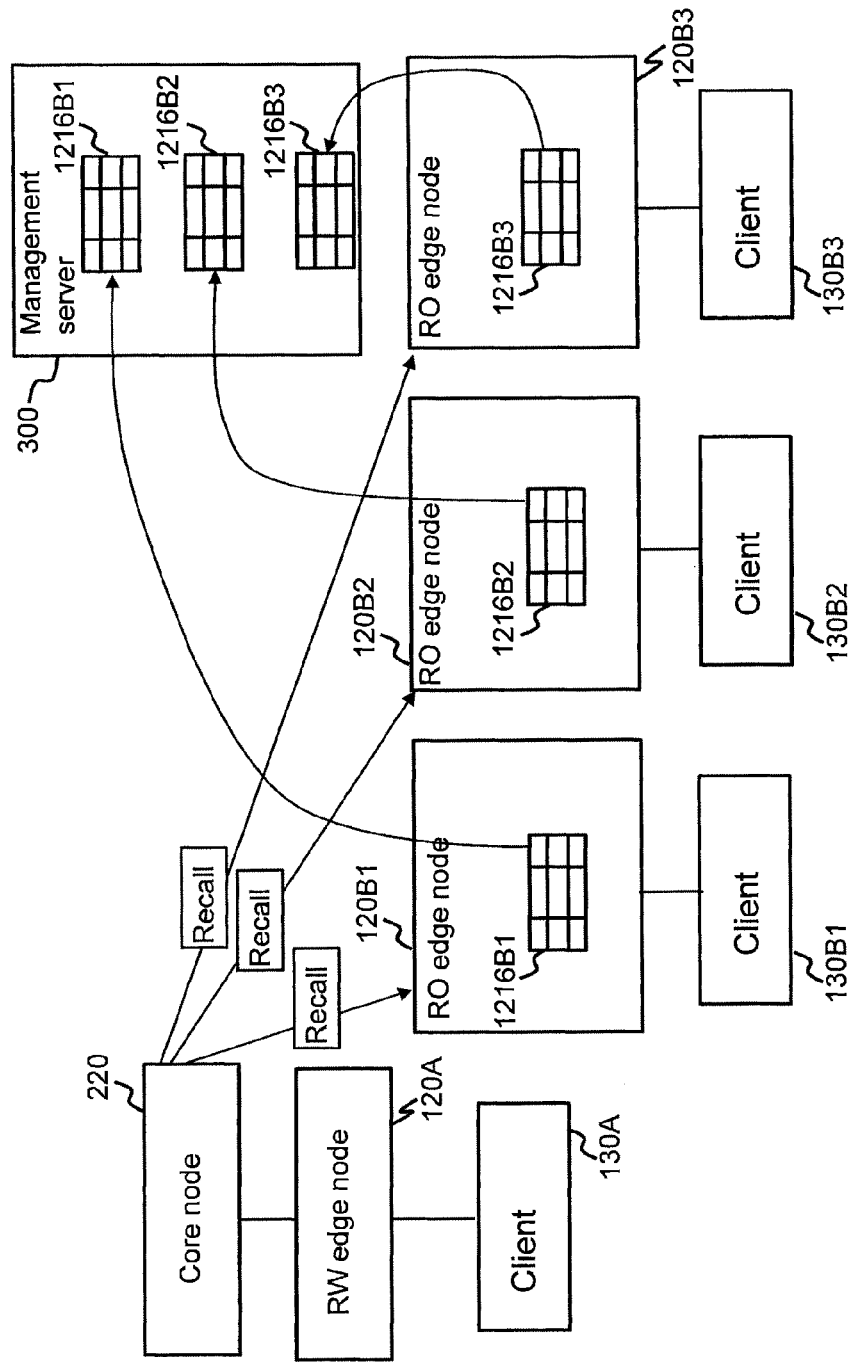
FIG. 24 is a view showing that a storage destination management table 1216 that is included in a management server 300 is shared by a plurality of RO edge nodes 120B.

As shown in FIG. 24, the program 310 can obtain the information that is included in the storage destination management table 1216 that is included in each of the RO edge nodes 120B via the communication network 1. By this configuration, the management server 300 can be provided with all of the storage destination management tables 1216 (a duplicate of the table 1216). The table 1216 that has been obtained is stored into a storage resource (such as a memory) that is included in the management server 300.

Each of the RO edge nodes 120B can access the management server 300, whereby the RO edge node 120B can refer to all of the storage destination management tables 1216. In the case in which a storage destination management table that is corresponded to the RO edge node 120B is updated for the node 120B, the RO edge node 120B transmits the information that is included in the table 1216 after the update to the management server 300 (in other words, the transmission destination of the storage destination information after the update is not other RO edge node 120B but the management server 300). By this configuration, the update of the table 1216 for the RO edge node 120B is reflected to the table 1216 that is included in the management server 300.

Figure 25:
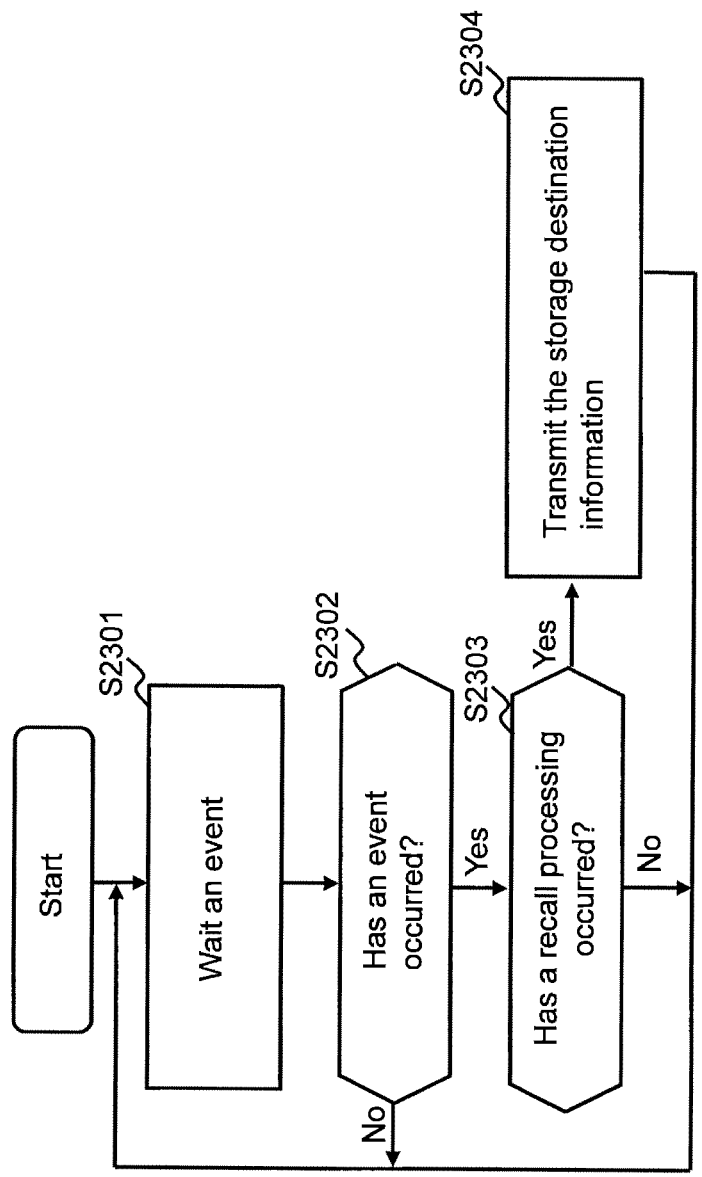
FIG. 25 is a flowchart showing a flow of a processing that is executed by a storage destination information sharing program 1215 in accordance with an embodiment 2 of the present invention.

FIG. 25 is a flowchart showing a flow of a processing that is executed by a storage destination information sharing program 1215 in accordance with an embodiment 2 of the present invention.

The storage destination information sharing program 1215 judges whether or not an event has occurred (S2301).

In the case in which an event has occurred (S2302: Yes), the program 1215 judges whether or not the event that has occurred is a recall processing (S2303).

In the case in which the event that has occurred is a recall processing (S2303: Yes), the program 1215 transmits the storage destination information related to a file that has been recalled (a file that has been cached) (for instance, the information that includes a file storage destination hash value 12161, a file entity hash value 12162, and the time and date of recall 12163) to the management server 300 (S2304).

Figure 26:
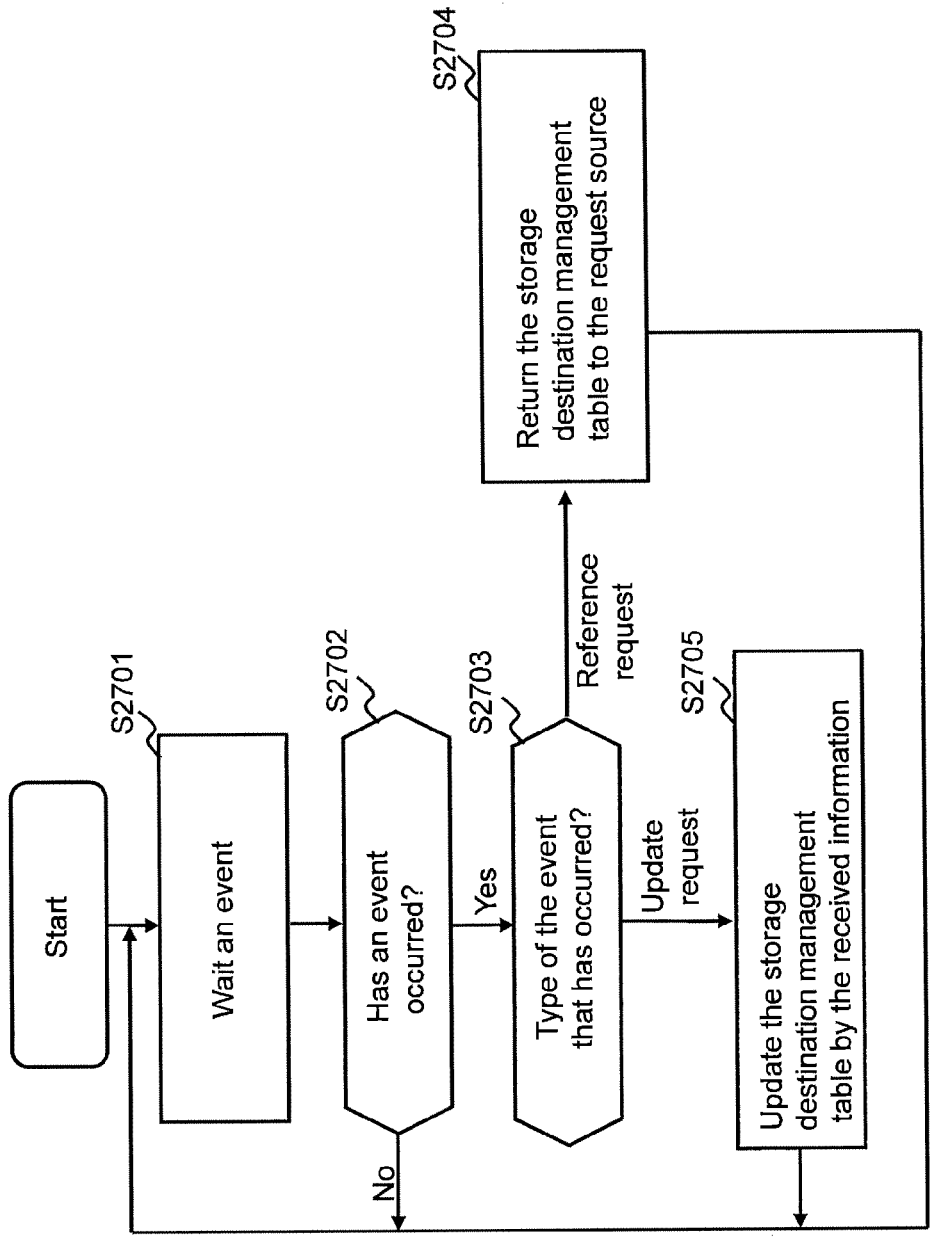
FIG. 26 is a flowchart showing a flow of a processing that is executed by a storage destination information sharing program 310 in a management server 300.

FIG. 26 is a flowchart showing a flow of a processing that is executed by a storage destination information sharing program 310 in a management server 300.

The storage destination information sharing program 310 judges whether or not an event has occurred (S2701).

In the case in which an event has occurred (S2702: Yes), the program 310 judges a type of the event that has occurred (S2703). The event is a "reference request" or an "update request". The requests are transmitted from the RO edge node 120B for instance.

In the case in which the event is a "reference request", the program 310 returns the information that is included in at least one storage destination management table 1216 that conforms to the reference request to the RO edge node 120B of the reference request source (S2704). The program 310 manages the final transmission date when the information that is included in the storage destination management table 1216 is transmitted to each of the RO edge nodes 120B. The program 310 can compare the final transmission date with the time and date of recall 12163, thereby deciding the information (the information in the storage destination management table 1216) to be transmitted to the RO edge node 120B that has issued the reference request.

In the case in which the event is an "update request", the program 310 registers the storage destination information accompanying the update request to the storage destination management table 1216 that is corresponded to the RO edge node 120B of the update request source (S2705).

While the preferred embodiments in accordance with the present invention have been described above, the present invention is not restricted to the embodiments.

For instance, an identifier of private or public can also be added to a file for at least one of the embodiments 1 and 2. In the case in which an identifier of public is added to a file that has been cached, the RO edge node 120B registers the information related to the file to the storage destination management table 1216. In the case in which an identifier of private is added to a file that has been cached, it is necessary that the RO edge node 120B register the information related to the file to the storage destination management table 1216.

Moreover for instance, one of a plurality of programs that are executed by an edge node (for instance, the load relaxation control program 1214) can also be executed by the management server 300. More specifically, the management server 300 can execute the edge group creation processing for instance.

Moreover for instance, one virtual server system can also be configured by at least two edge nodes 120. That is, the edge nodes 120 can be handled as one server system by a client.

Moreover for instance, it is possible that each of the RO edge nodes 120B does not receive a write request from the client 130B. In the case in which an RO edge node 120B receives a write request, the write request can be transferred to the RW edge node 120A.

Moreover for instance, an edge node that transmits a write request to the core node 220 and that does not transmit a read request to the core node 220 can also be adopted as substitute for the RW edge node 120A.

The invention claimed is:

1. A file server system comprising:
    a plurality of edge nodes that are coupled to a core node that is one file server and that are a plurality of file servers that receive, at least one of: a write request and a read request, of a file from at least one client; and
    an edge storage region that is a storage region configured to store a file for each of the edge nodes,
    wherein the plurality of edge nodes comprises at least one first edge node and second edge nodes that are more than the first edge node,
    wherein the first edge node is an edge node configured to transmit a write request of a file to the core node,
    wherein each of the second edge nodes is an edge node configured to not transmit a write request of a file to the core node and configured to transmit a read request of a file to the core node,
    wherein each of the edge nodes is configured to write the file that has been obtained by a recall of the file to the edge storage region of the edge node,
    wherein each of the second edge nodes is provided with the storage destination management information that is corresponded to the second edge node,
    wherein the storage destination management information comprises the information that indicates a storage destination for the core node of the file that has been written to the edge storage region for the second edge node that is corresponded to the information and comprises the information that indicates a recall date that is a date that has been read by the second edge node,
    wherein each of the second edge nodes is configured to execute the following processing based on the storage destination management information that is corresponded to each of the plurality of second edge nodes:
        (A) judging whether or not a first file that has been written to a first edge storage region that is an edge storage region for the second edge node is different from a second file that has been written to an edge storage region different from the first edge storage region in which a storage destination for the core node is equal to that of the first file;
        (B) judging whether or not the first file is older than the second file based on a recall date of the first file and a recall date of the second file when the result of a judgment of the (A) is positive; and
        (C) not creating a stub for the first file when the result of a judgment of the (A) or (B) is negative, and creating a stub for the first file when the result of a judgment of the (B) is positive, wherein the plurality of second edge nodes is divided into at least two groups, wherein, when each of the second edge nodes receives a read request of a read target file that is a file that is corresponded to a stub from a client, the second edge node is configured to execute the following processing:

(D) judging whether or not the read target file has been stored into a file storage region for any other second edge node that is included in a target group based on the storage destination management information of each of the other second edge nodes that is included in the target group that is a group that includes the second edge node;

(E) executing a recall of the read target file when the result of a judgment of the above (D) is negative; and (F) transmitting a read request of the read target file to other second edge node that is corresponded to an edge storage region that has stored the read target file and transmitting the read target file that has been read by a response to the read request to a client when the result of a judgment of the above (D) is positive.

2. A file server system according to claim 1, wherein: the at least two groups are configured in such a manner that a duplicated file is not preferably included in a plurality of files that has been stored into at least two edge storage regions for at least two second edge nodes that are included in one group.

3. A file server system according to claim 2, wherein each of the groups is configured by one representative node and at least zero non-representative nodes, wherein at least two edge nodes in which an amount of caches is equal to or larger than a predetermined value and an amount of duplicated files is equal to or larger than a predetermined value for the plurality of second edge nodes are at least two representative nodes that are corresponded to the at least two groups, wherein the amount of caches for the second edge node is a total amount of at least one file that has been stored into an edge storage region for the second edge node, wherein the amount of duplicated files for the second edge node is a total amount of at least one file that is duplicated with a file that has been stored into an edge storage region for other second edge node among at least one file that has been stored into an edge storage region for the second edge node, wherein the non-representative node is a second edge node that is not a representative node.

4. A file server system according to claim 1, wherein, when the first edge node receives a write request of a file, the first edge node is configured to store the file into an edge storage region for the first edge node and then transmit the write request of the file to the core node;

wherein, when (E), a read request for a recall of the read target file is transmitted to not the core node but the first edge node, and the first edge node is configured to obtain a file that conforms to the read request from the edge storage region for the first edge node by a response to the read request, and transmit the file to a second edge node that is a transmission source of the read request.

5. A file server system according to claim 1, wherein, when (F), when the at least two read target files have been stored into at least one edge storage region for at least one other second edge node that is included in the target group, one is selected from the at least two read target files, and a read request is transmitted to the second edge node that is corresponded to an edge storage region that has stored the selected read target file, wherein the selected read target file is a file that is corresponded to, at least one of:

(f1) a file that has been stored into an edge storage region of other second edge node in which a distance to a second edge node configured to execute (F) is shortest among at least one other second edge node that is included in the target group;

(f2) a file that has been stored into an edge storage region of the second edge node in which an access load is lowest among at least one other second edge node in the target group; and (f3) a file in which a recall date is latest.

6. A file server system according to claim 1, wherein the plurality of groups is configured when a frequency of a recall that is executed by the second edge node is equal to or larger than a predetermined value.

7. A file server system according to claim 6, wherein, when a frequency of a recall that is executed by the second edge node is less than a predetermined value, a group that includes the second edge node is released.

8. A file server system according to claim 6, wherein, when the first edge node receives a write request of a file, the first edge node is configured to store the file into an edge storage region for the first edge node and then transmit the write request of the file to the core node, wherein, when there is a group that includes the second edge node that executes (E), a read request for a recall of the read target file is transmitted to not the core node but the first edge node in the (E);

wherein, when there is not a group that includes the second edge node that executes (E), a read request for a recall of the read target file is transmitted to the core node in (E).

9. A file server system according to claim 1, wherein the storage destination management information includes a hash value of a file, wherein in (A), it is judged whether or not a hash value of the first file is different from a hash value of the second file.

10. A file server system according to claim 1, wherein the storage destination management information includes the information related to a file to which the information that means a public has been added and does not include the information related to a file to which the information that means a private has been added.

11. A storage control method wherein the first edge node that is a file server that is coupled to a core node that is one file server and to a client executes processing based on the storage destination management information of the first edge node and the storage destination management information of the second edge node, comprising:

(A) judging whether or not a first file that has been written to a first file storage region that is a file storage region for the first edge node is different from a second file that has been written to a file storage region for the second edge node in which a storage destination for the core node is equal to that of the first file;

(B) judging whether or not the first file is older than the second file based on a recall date of the first file and a recall date of the second file when the result of a judgment of (A) is positive; and (C) not creating a stub for the first file when the result of a judgment of (A) or (B) is negative, and creating a stub for the first file when the result of a judgment of (B) is positive, and the storage destination management information includes the information that indicates a storage destination for the core node of the file that has been written to the file storage region for the edge node that is corresponded to the information and includes the information that indicates a recall date that is a date that has been read by the edge node, wherein the plurality of second edge nodes is divided into at least two groups, wherein, when each of the second edge nodes receives a read request of a read target file that is a file that is corresponded to a stub from a client, the second edge node is configured to execute the following processing:

(D) judging whether or not the read target file has been stored into a file storage region for any other second edge node that is included in a target group based on the storage destination management information of each of the other second edge nodes that is included in the target group that is a group that includes the second edge node;

(E) executing a recall of the read target file when the result of a judgment of the above (D) is negative; and (F) transmitting a read request of the read target file to other second edge node that is corresponded to an edge storage region that has stored the read target file and transmitting the read target file that has been read by a response to the read request to a client when the result of a judgment of the above (D) is positive.

12. An edge node that is a first edge node that is a file server that is coupled to a core node that is one file server and to a client and that stores a file into a first file storage region, comprising:

a communication interface apparatus;

a storage resource; and a controller that is coupled to the communication interface apparatus and the storage resource, wherein the storage resource is configured to store the storage destination management information, the storage destination management information includes the information that indicates a storage destination for the core node of the file that has been written to the file storage region for the edge node that is corresponded to the information and includes the information that indicates a recall date that is a date that has been read by the edge node, and the controller is configured to execute processing based on storage destination management information of an edge node that is separate from the storage destination management information, comprising:

(A) judging whether or not a first file that has been written to the first file storage region is different from a second file that has been written to a file storage region for the separate edge node in which a storage destination for the core node is equal to that of the first file;

(B) judging whether or not the first file is older than the second file based on a recall date of the first file and a recall date of the second file when the result of a judgment of (A) is positive; and (C) not creating a stub for the first file when the result of a judgment of (A) or (B) is negative, and creating a stub for the first file when the result of a judgment of (B) is positive, wherein the plurality of second edge nodes is divided into at least two groups, wherein, when each of the second edge nodes receives a read request of a read target file that is a file that is corresponded to a stub from a client, the second edge node is configured to execute the following processing:

(D) judging whether or not the read target file has been stored into a file storage region for any other second edge node that is included in a target group based on the storage destination management information of each of the other second edge nodes that is included in the target group that is a group that includes the second edge node;

(E) executing a recall of the read target file when the result of a judgment of the above (D) is negative; and (F) transmitting a read request of the read target file to other second edge node that is corresponded to an edge storage region that has stored the read target file and transmitting the read target file that has been read by a response to the read request to a client when the result of a judgment of the above (D) is positive.

* * * * *